United States Patent
Huang et al.

(10) Patent No.: US 12,487,881 B2
(45) Date of Patent: Dec. 2, 2025

(54) DECODING METHOD, MEMORY STORAGE DEVICE AND MEMORY CONTROL CIRCUIT UNIT

(71) Applicant: PHISON ELECTRONICS CORP., Miaoli (TW)

(72) Inventors: Bo Lun Huang, Tainan (TW); Yu-Hsiang Lin, Yunlin County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 17 days.

(21) Appl. No.: 18/433,407

(22) Filed: Feb. 6, 2024

(65) Prior Publication Data
US 2025/0208947 A1 Jun. 26, 2025

(30) Foreign Application Priority Data
Dec. 22, 2023 (TW) ................................. 112150462

(51) Int. Cl.
G06F 11/10 (2006.01)

(52) U.S. Cl.
CPC ...... *G06F 11/1004* (2013.01); *G06F 11/1068* (2013.01)

(58) Field of Classification Search
CPC .. G06F 11/1068; G06F 3/0619; G06F 3/0679; G11C 29/52; G11C 29/78; H03M 13/45
See application file for complete search history.

(56) References Cited

U.S. PATENT DOCUMENTS

| | | | |
|---|---|---|---|
| 9,906,244 B2* | 2/2018 | Hsiao | G11C 29/028 |
| 10,680,659 B2* | 6/2020 | Poznanski | H03M 13/41 |
| 2014/0289584 A1* | 9/2014 | Chilappagari | G06F 11/1068 |
| | | | 714/755 |
| 2016/0092300 A1* | 3/2016 | Lei | G06F 11/1068 |
| | | | 714/764 |
| 2021/0294696 A1* | 9/2021 | Nogami | H03M 13/1102 |

* cited by examiner

*Primary Examiner* — Albert Decady
*Assistant Examiner* — Grace V Braden
(74) *Attorney, Agent, or Firm* — JCIPRNET

(57) ABSTRACT

A decoding method, comprising: sending a first read command sequence corresponding to a host system to read a first physical unit of a physical unit group to obtain a first data frame; responding to a decoding failure of a first single-frame decoding performed on the first data frame, sending a plurality of second read command sequences to read a plurality of second physical units in the physical unit group to obtain a plurality of second data frames; respectively performing a second single-frame decoding on the second data frames; performing a XOR operation on the corresponding data frame of each physical unit of the physical unit group to obtain first error evaluation information; generating enhanced first error evaluation information based on the first error evaluation information; and performing a third single-frame decoding on the first data frame based on the enhanced first error evaluation information.

24 Claims, 13 Drawing Sheets

| Voltage range | A | B | C | D | E | F | |
|---|---|---|---|---|---|---|---|
| LLR(0) | -11 | -6 | -3 | 3 | 6 | 11 | <--- M=M(1) |
| LLR(1) | -8 | -4 | -2 | 2 | 4 | 8 | <--- M=M(2) |
| LLR(2) | -7 | -3 | -1 | 1 | 3 | 7 | <--- M=M(3) |

DECODING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 112150462, filed on 22 Dec. 2023. The entirety of the above-mentioned patent application is hereby incorporated by reference herein and made a part of this specification.

BACKGROUND

Technical Field

The present invention relates to a decoding technique and, in particular, to a decoding method, a memory storage device and a memory control circuit unit.

Description of Related Art

The rapid growth of portable electronic devices such as cellular telephones and notebook computers over the past few years has led to a rapid increase in consumer demand for storage media. Since rewritable non-volatile memory modules (e.g., flash memory) are characterized by non-volatile data, low power consumption, small size, and no mechanical structure, they are very suitable for incorporation into the above-mentioned examples of portable electronic devices.

Some types of memory storage devices support single-frame decoding for a single data frame and multi-frame decoding for multiple data frames. For example, in general, single-frame decoding can be used to correct errors in a single data frame. In the event that a single-frame decoding fails due to a large number of error bits in a data frame, the error in a target data frame can be further corrected by multi-frame decoding with other data frames in the same encoding group. However, if there are too many data frames in the same encoding group that cannot be corrected by single-frame decoding, multi-frame decoding for that encoding group cannot guarantee that the errors in the target data frame can be fully corrected, which leads to a reduction in decoding efficiency. In addition, the error evaluation information used by the current technology is subject to interference from error bits in data frames other than the target data frame, such that the accuracy of the decoding operation is reduced.

SUMMARY

The present invention provides a decoding method, a memory storage device, and a memory control circuit unit that can enhance decoding efficiency.

An exemplary embodiment of the present invention provides a decoding method, adapted for a rewritable non-volatile memory module, wherein the rewritable non-volatile memory module comprises a plurality of physical units, and the decoding method comprises: transmitting a first read command sequence, wherein the first read command sequence instructs to read a first physical unit of the plurality of physical units, and the first physical unit belongs to a physical unit group; performing a first single-frame decoding on a first data frame read from that first physical unit; in response to the first single-frame decoding is failed, obtaining a first soft bit information corresponding to the first data frame and transmitting a plurality of second read command sequences, wherein the plurality of second read command sequences respectively instruct to read a plurality of second physical units other than the first physical unit in the physical unit group; performing a second single-frame decoding on a plurality of second data frames read from the plurality of second physical units respectively; performing a XOR operation on a data frame corresponding to each physical unit, after the first single-frame decoding or the second single-frame decoding, of the physical unit group, so as to obtain a first error evaluation information corresponding to the physical unit group; generating an enhanced first error evaluation information according to the first error evaluation information; and performing a third single-frame decoding on the first data frame according to the enhanced first error evaluation information and a first reliability information corresponding to the first physical unit.

An exemplary embodiment of the present invention further provides a memory storage device, comprising: a connection interface unit, configured to couple to a host system; a rewritable non-volatile memory module, wherein the rewritable non-volatile memory module comprises a plurality of physical units; and a memory control circuit unit coupled to the connection interface unit and the rewritable non-volatile memory module. The memory control circuit unit is configured to: transmit a first read command sequence, wherein the first read command sequence instructs to read a first physical unit of the plurality of physical units, and the first physical unit belongs to a physical unit group; perform a first single-frame decoding on a first data frame read from that first physical unit; in response to the first single-frame decoding is failed, obtain a first soft bit information corresponding to the first data frame and transmit a plurality of second read command sequences, wherein the plurality of second read command sequences respectively instruct to read a plurality of second physical units other than the first physical unit in the physical unit group; perform second single-frame decoding on a plurality of second data frames read from the plurality of second physical units respectively; perform a XOR operation on a data frame corresponding to each physical unit, after the first single-frame decoding or the second single-frame decoding, of the physical unit group, so as to obtain a first error evaluation information corresponding to the physical unit group; generate an enhanced first error evaluation information according to the first error evaluation information; and perform a third single-frame decoding on the first data frame according to the enhanced first error evaluation information and a first reliability information corresponding to the first physical unit.

An exemplary embodiment of the present invention further provides a memory control circuit unit, adapted for controlling a rewritable non-volatile memory module, wherein the rewritable non-volatile memory module comprises a plurality of physical units, and the memory control circuit unit comprises: a host interface, configured to couple to a host system; a memory interface, configured to couple to the rewritable non-volatile memory module; a decoding circuit; and a memory management circuit coupled to the host interface, the memory interface, and the decoder circuit. The memory management circuit is configured to: transmit a first read command sequence, wherein the first read command sequence instructs to read a first physical unit of the plurality of physical units, and the first physical unit belongs to a physical unit group; instruct the decoding circuit to perform a first single-frame decoding on a first data frame read from that first physical unit; in response to the first single-frame decoding is failed, obtain a first soft bit information corresponding to the first data frame and transmit a plurality of second read command sequences, wherein the plurality of second read command sequences respectively instruct to read a plurality of second physical units other than the first physical unit in the physical unit group; instruct the decoding circuit to perform second single-frame decoding on a plurality of second data frames read from the plurality of second physical units respectively; perform a XOR operation on a data frame corresponding to each physical unit, after the first single-frame decoding or the second single-frame decoding, of the physical unit group, so as to obtain a first error evaluation information corresponding to the physical unit group; generate an enhanced first error evaluation information according to the first error evaluation information; and instruct the decoding circuit to perform a third single-frame decoding on the first data frame according to the enhanced first error evaluation information and a first reliability information corresponding to the first physical unit.

Based on the above, the provided decoding method, the memory storage device, and the memory control circuit unit by the exemplary embodiments of the present invention may improve the decoding success rate for target data frames and/or non-target data frames in a particular physical unit group by continually updating and generating the first error evaluation information and enhanced first error evaluation information corresponding to the physical unit group. In addition, by alternately performing single-frame decoding of target data frames and non-target data frames in the same physical unit group and updating the first error evaluation information and the enhanced first error evaluation information based on the decoding results, the decoding success rate of subsequently performed single-frame decoding can also be improved. Furthermore, by adjusting the reliability information used in subsequent decoding operations performed on the target data frame with the enhanced first error evaluation information that better reflects the target data frame, the success rate of decoding on the target data frame can be improved, which in turn increases the efficiency and correctness of the reading operation of the memory storage device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In general, a memory storage device (also referred to as a memory storage system) includes a rewritable non-volatile memory module and a controller (also referred to as a control circuit). The memory storage device may be used with a host system, such that the host system may write data into the memory storage device or read data from the memory storage device.

Figure 1:
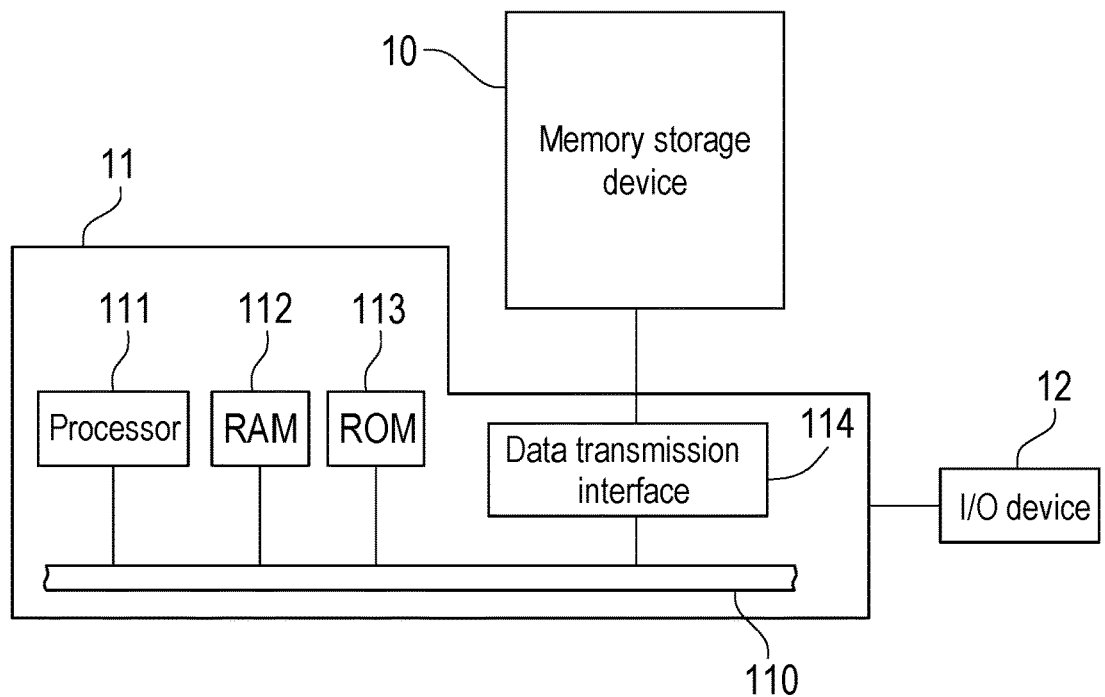
FIG. 1 is a schematic diagram of a host system, a memory storage device, and an input/output (I/O) device shown according to an exemplary embodiment of the present invention.
Figure 2:
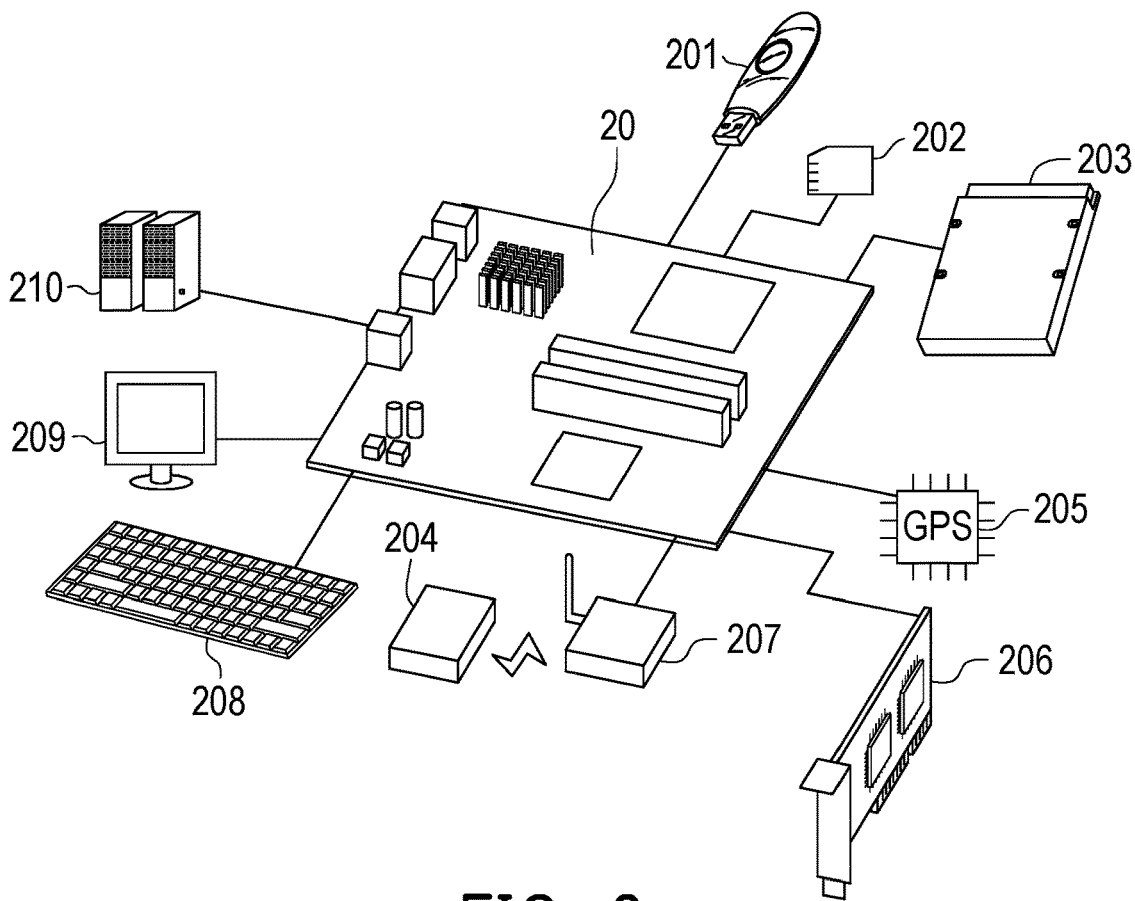
FIG. 2 is a schematic diagram of a host system, a memory storage device, and an I/O device shown according to an exemplary embodiment of the present invention.

FIG. 1 is a schematic diagram of a host system, a memory storage device, and an input/output (I/O) device shown according to an exemplary embodiment of the present invention. FIG. 2 is a schematic diagram of a host system, a memory storage device, and an I/O device shown according to an exemplary embodiment of the present invention.

Referring to FIG. 1 and FIG. 2, a host system 11 may include a processor 111, a random-access memory (RAM) 112, a read-only memory (ROM) 113, and a data transmission interface 114. The processor 111, the RAM 112, the ROM 113, and the data transmission interface 114 may be coupled to a system bus 110.

In an exemplary embodiment, the host system 11 may be coupled to the memory storage device 10 via the data transmission interface 114. For example, the host system 11 may store data into the memory storage device 10 or read data from the memory storage device 10 via the data transmission interface 114. Moreover, the host system 11 may be coupled to the I/O device 12 via the system bus 110. For example, the host system 11 may send an output signal to the I/O device 12 or receive an input signal from the I/O device 12 via the system bus 110.

In an exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114.

In an exemplary embodiment, the memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

In an exemplary embodiment, the host system 11 is a computer system. In an exemplary embodiment, the host system 11 may be any system that may substantially store data with the memory storage device. In an exemplary embodiment, the memory storage device 10 and the host system 11 may respectively include a memory storage device 30 and a host system 31 of FIG. 3.

Figure 3:
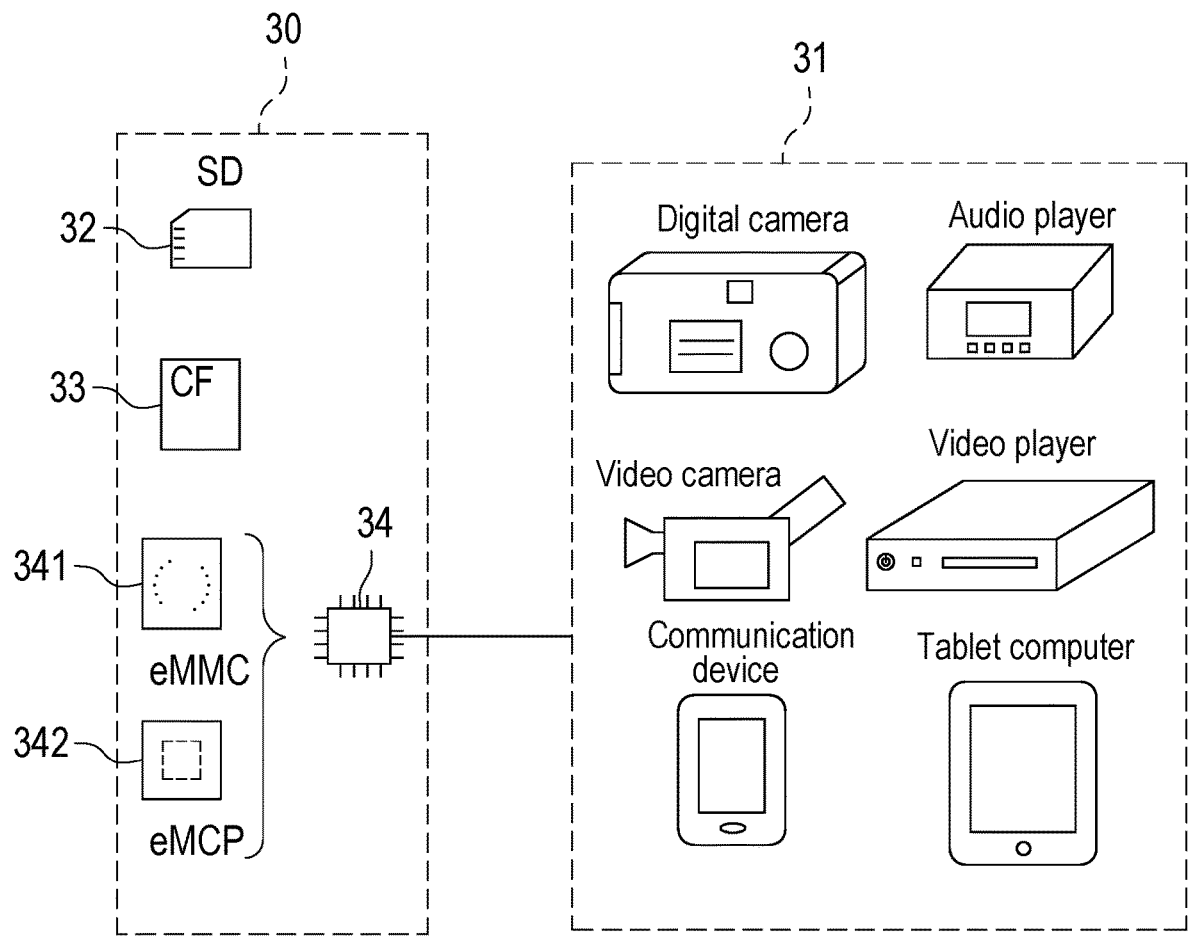
FIG. 3 is a schematic diagram of a host system and a memory storage device shown according to an exemplary embodiment of the present invention.

FIG. 3 is a schematic diagram of a host system and a memory storage device shown according to an exemplary embodiment of the present invention. Referring to FIG. 3, the memory storage device 30 may be used in conjunction with the host system 31 to store data. For example, the host system 31 may be a system such as a digital camera, a camcorder, a communication device, an audio player, a video player, or a tablet computer. For example, the memory storage device 30 may be various non-volatile memory storage devices such as a Secure Digital (SD) card 32, a Compact Flash (CF) card 33, or an embedded storage device 34 used by the host system 31. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
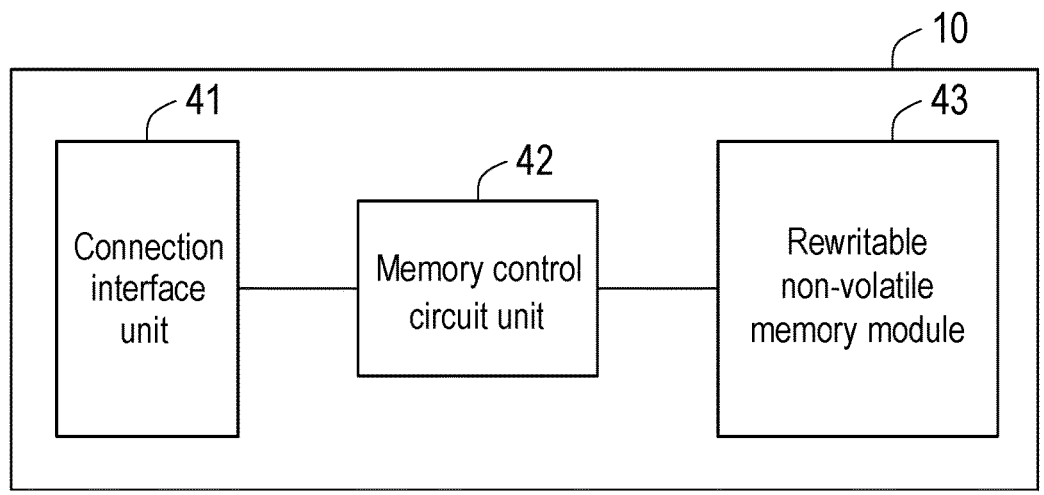
FIG. 4 is a schematic diagram of a memory storage device shown according to an exemplary embodiment of the present invention.

FIG. 4 is a schematic diagram of a memory storage device shown according to an exemplary embodiment of the present invention. Referring to FIG. 4, the memory storage device 10 includes a connection interface unit 41, a memory control circuit unit 42, and a rewritable non-volatile memory module 43.

The connection interface unit 41 is configured to couple the memory storage device 10 to the host system 11. The memory storage device 10 may be communicated with the host system 11 via the connection interface unit 41. In an exemplary embodiment, the connection interface unit 41 is compatible with the Peripheral Component Interconnect Express (PCI Express) standard. In an exemplary embodiment, the connection interface unit 41 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 41 may be sealed in a chip with the memory control circuit unit 42. Alternatively, the connection interface unit 41 is disposed outside of a chip containing the memory control circuit unit 42.

The memory control circuit unit 42 is coupled to the connection interface unit 41 and the rewritable non-volatile memory module 43. The memory control circuit unit 42 is configured to perform a plurality of logic gates or control commands implemented in a hardware form or in a firmware form. The memory control circuit unit 42 also performs operations such as writing, reading, and erasing data in the rewritable non-volatile memory module 43 according to the commands of the host system 11.

The rewritable non-volatile memory module 43 is configured to store the data written by the host system 11. The rewritable non-volatile memory module 43 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 43 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 43 has a plurality of storage states. Which storage state one memory cell belongs to may be determined via the application of a read voltage, so as to obtain one or a plurality of bits stored by the memory cell.

In an exemplary embodiment, the memory cells of the rewritable non-volatile memory module 43 may form a plurality of physical programming units, and these physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit region and a redundancy bit region. The data bit region contains a plurality of physical sectors configured to store user data, and the redundancy bit region is configured to store system data (for example, management data such as an error correcting code). In an exemplary embodiment, the data bit region contains 32 physical sectors, and the size of one physical sector is 512 bytes (B). However, in other exemplary embodiments, the data bit region may also contain 8, 16, or a greater or lesser number of physical sectors, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
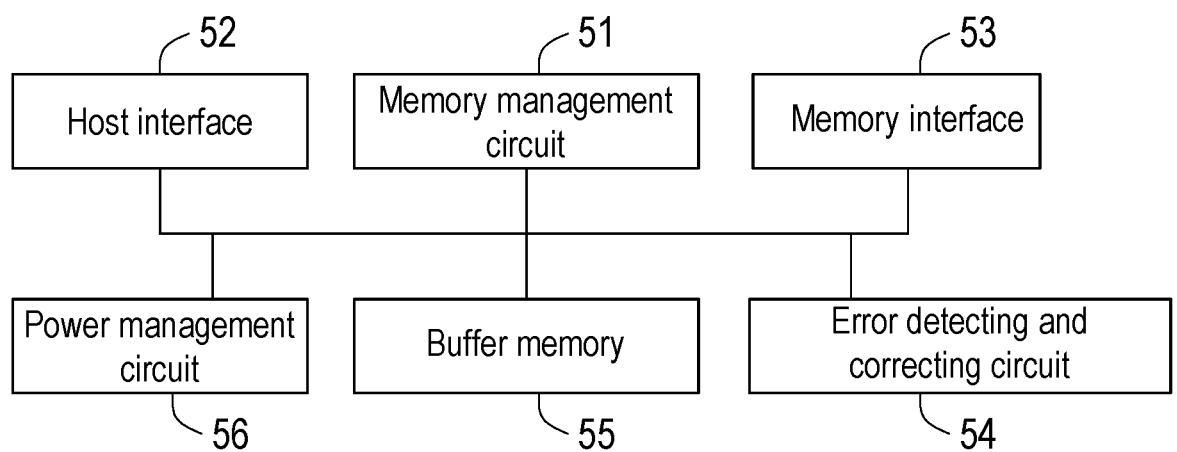
FIG. 5 is a schematic diagram of a memory control circuit unit shown according to an exemplary embodiment of the present invention.

FIG. 5 is a schematic diagram of a memory control circuit unit shown according to an exemplary embodiment of the present invention. Referring to FIG. 5, the memory control circuit unit 42 includes a memory management circuit 51, a host interface 52, a memory interface 53, and an error detecting and correcting circuit 54.

The memory management circuit 51 is used to control the overall operation of the memory control circuit unit 42. Specifically, the memory management circuit 51 has multiple control commands, and when the memory storage device 10 operates, the control commands are executed to perform operations such as writing, reading, and erasing of data. The following description of the operation of the memory management circuit 51 is equivalent to the description of the operation of the memory control circuit unit 42.

In one exemplary embodiment, the control commands of the memory management circuit 51 are implemented in a firmware form. For example, the memory management circuit 51 has a microprocessor unit (not shown) and a read only memory (not shown), and the control commands are programmed into this read only memory. When the memory storage device 10 operates, the control commands are executed by the microprocessor unit to perform operations such as writing, reading, and erasing of data.

In one exemplary embodiment, the control commands of the memory management circuit 51 may also be stored in a specific area of the rewritable non-volatile memory module 43 (e.g., a system area dedicated to storing system data in the memory module) in a program code form. In addition, the memory management circuit 51 has a microprocessor unit (not shown), a read only memory (not shown), and a random access memory (not shown). In particular, the read only memory has a boot code, and when the memory control circuit unit 42 is enabled, the microprocessor unit first executes this boot code to load the control commands stored in the rewritable non-volatile memory module 43 into the random access memory of the memory management circuit 51. Afterwards, the microprocessor unit runs these control commands to perform operations such as writing, reading, and erasing of data.

In one exemplary embodiment, the control commands of the memory management circuit 51 may also be implemented in a hardware form. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is used for managing the memory cells or a memory cell group of the rewritable non-volatile memory module 43. The memory writing circuit is used for issuing a write command sequence to the rewritable non-volatile memory module 43 to write data into the rewritable non-volatile memory module 43. The memory reading circuit is used for issuing a read command sequence to the rewritable non-volatile memory module 43 to read data from the rewritable non-volatile memory module 43. The memory erasing circuit is used for issuing an erase command sequence to the rewritable non-volatile memory module 43 to erase data from the rewritable non-volatile memory module 43. The data processing circuit is used for processing the data to be written into the rewritable non-volatile memory module 43 and the data read from the rewritable non-volatile memory module 43. The write command sequence, the read command sequence, and the erase command sequence may respectively include one or more program codes or command codes for instructing the rewritable non-volatile memory module 43 to perform corresponding writing, reading, and erasing operations. In one exemplary embodiment, the memory management circuit 51 may also issue other types of command sequences to instruct the rewritable non-volatile memory module 43 to perform corresponding operations.

The host interface 52 is coupled to the memory management circuit 51. The memory management circuit 51 may communicate with the host system 11 through the host interface 52. The host interface 52 may be used for getting and identifying the commands and data transmitted by the host system 11. For example, the commands and data of the host system 11 may be transmitted to the memory management circuit 51 through the host interface 52. In addition, the memory management circuit 51 may transmit data to the host system 11 through the host interface 52. In this exemplary embodiment, the host interface 52 is compatible with the PCI Express standard. However, it should be understood that the disclosure is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51 and is used for accessing the rewritable non-volatile memory module 43. For example, the memory management circuit 51 may access the rewritable non-volatile memory module 43 through the memory interface 53. In other words, the data to be written into the rewritable non-volatile memory module 43 is converted into a format acceptable to the rewritable non-volatile memory module 43 via the memory interface 53. Specifically, if the memory management circuit 51 is to access the rewritable non-volatile memory module 43, the memory interface 53 transmits a corresponding command sequence. For example, the command sequences may include a write command sequence to instruct data writing, a read command sequence to instruct data reading, an erase command sequence to instruct data erasing, and corresponding command sequences for instructing various memory operations (e.g., changing the read voltage level, executing a garbage collection (GC) operation, etc.). These command sequences are, for example, generated by the memory management circuit 51 and transmitted to the rewritable non-volatile memory module 43 via the memory interface 53. These command sequences may include one or more signals or data on the bus. The signals or data may include command codes or program codes. For example, the read command sequence includes information such as the read identification code, the memory address, etc.

The error detecting and correcting circuit 54 is coupled to the memory management circuit 51 and is configured to perform an error detecting and correcting operation to ensure the correctness of the data. Specifically, when the memory management circuit 51 gets a write command from the host system 11, the error detecting and correcting circuit 54 generates a corresponding error correcting code (ECC) and/or error detecting code (EDC) for the data corresponding to the write command, and the memory management circuit 51 writes the data corresponding to the write command and the corresponding error correcting code and/or error detecting code to the rewritable non-volatile memory module 43. Afterwards, when the memory management circuit 51 reads data from the rewritable non-volatile memory module 43, it simultaneously reads the error correcting code and/or the error detecting code corresponding to this data, and the error detecting and correcting circuit 54 performs the error detecting and correcting operation on the read data according to this error correcting code and/or error detecting code. For example, the error detecting and correcting circuit 54 may support various encoding/decoding algorithms such as low density parity check code (LDPC code), BCH code, Reed-Solomon code (RS code), Exclusive OR (XOR) code, etc.

The basic unit for the error detecting and correcting circuit 54 to perform encoding/decoding is one frame (also referred to as a data frame). One frame may include multiple data bits. In one exemplary embodiment, one frame includes 256 bits. However, in another exemplary embodiment, one frame may also include more (e.g., 4K bytes) or fewer bits.

The error detecting and correcting circuit 54 may perform a single-frame encoding and decoding on data in a single frame, and the error detecting and correcting circuit 54 may also perform a multi-frame encoding and decoding on data in multiple frames. In one exemplary embodiment, the error detecting and correcting circuit 54 performs the single-frame encoding and decoding based on the LDPC code, and the disclosure is not limited thereto. In one exemplary embodiment, the error detecting and correcting circuit 54 performs the multi-frame encoding and decoding based on the BCH code, the RS code, and the XOR code, and the disclosure is not limited thereto. Depending on the encoding/decoding algorithm employed, the error detecting and correcting circuit 54 may encode the data to be protected to generate a corresponding error correcting code and/or error detecting code. Afterwards, the error correcting code and/or error detecting code generated by encoding may be used to correct the error in the data to be protected. For ease of description, the error correcting code and/or error detecting code generated through encoding will be collectively referred to as parity data below.

In one exemplary embodiment, the memory control circuit unit 42 further includes a buffer memory 55 and a power management circuit 56. The buffer memory 55 is coupled to the memory management circuit 51 and used to temporarily store data. The power management circuit 56 is coupled to the memory management circuit 51 and used to control the power of the memory storage device 10.

In one exemplary embodiment, the rewritable non-volatile memory module 43 in FIG. 4 may include a flash memory module. In one exemplary embodiment, the memory control circuit unit 42 in FIG. 4 may include a flash memory controller. In one exemplary embodiment, the memory management circuit 51 in FIG. 5 may include a flash memory management circuit.

Figure 6:
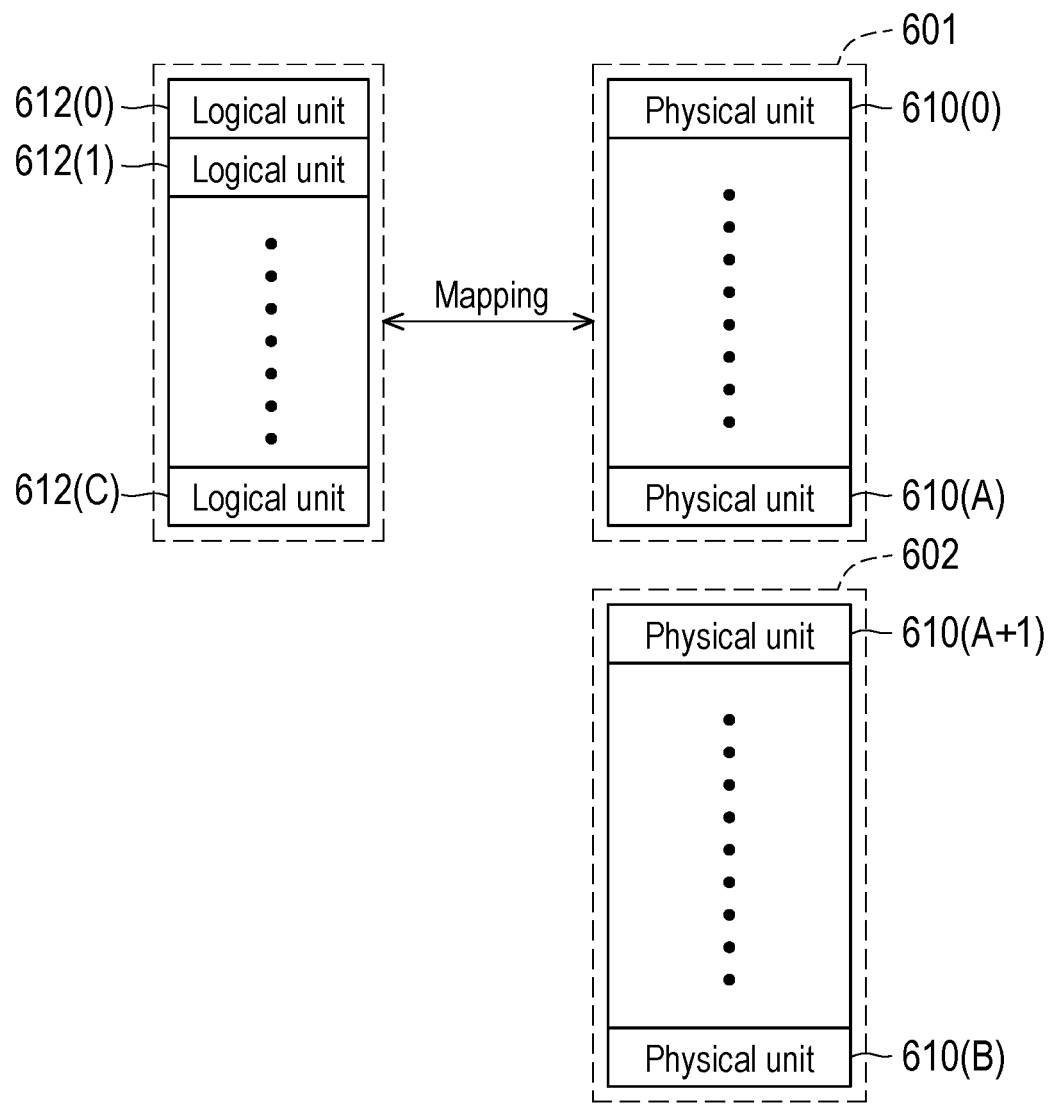
FIG. 6 is a schematic diagram of managing a rewritable non-volatile memory module shown according to exemplary embodiments of the present invention.

FIG. 6 is a schematic diagram of managing a rewritable non-volatile memory module according to exemplary embodiments of the present invention. Referring to FIG. 6, the memory management circuit 51 may logically group the physical units 610(0) to 610(B) in the rewritable non-volatile memory module 43 into a storage area 601 and a spare area 602.

In one exemplary embodiment, one physical unit refers to one physical address or one physical programming unit. In one exemplary embodiment, one physical unit may also be formed by multiple consecutive or non-consecutive physical addresses. In one exemplary embodiment, one physical unit may also refer to one virtual block (VB). One virtual block may include multiple physical addresses or multiple physical programming units. In one exemplary embodiment, one virtual block may also include one or more physical erasing units.

The physical units 610(0) to 610(A) in the storage area 601 are used for storing user data (e.g., user data from the host system 11 in FIG. 1). For example, the physical units 610(0) to 610(A) in the storage area 601 may store valid data and invalid data. The physical units 610(A+1) to 610(B) in the spare area 602 do not store data (e.g., valid data). For example, if a certain physical unit does not store valid data, this physical unit may be associated (or added) to the spare area 602. In addition, the physical units in the spare area 602 (or the physical units not storing valid data) may be erased. When new data is written, one or more physical units may be extracted from the spare area 602 to store this new data. In one exemplary embodiment, the spare area 602 is also referred to as a free pool.

The logical units 612(0) to 612(C) may be configured in the memory management circuit 51 to map the physical units 610(0) to 610(A) in the storage area 601. In one exemplary embodiment, each of the logical units corresponds to one logical address. For example, one logical address may include one or more logical block addresses (LBA) or other logical management units. In one exemplary embodiment, one logical unit may also correspond to one logical programming unit or be configured by multiple consecutive or non-consecutive logical addresses.

It should be noted that one logical unit may be mapped to one or more physical units. If a certain physical unit is currently mapped by a certain logical unit, it means that the data currently stored in this physical unit includes valid data. On the contrary, if a certain physical unit is not currently mapped by any logical unit, it means that the data currently stored in this physical unit is invalid data.

The memory management circuit 51 may record the management data (also referred to as the logical to physical mapping information) describing the mapping relationship between logical units and physical units in at least one logical to physical mapping table. When the host system 11 reads data from the memory storage device 10 or writes data to the memory storage device 10, the memory management circuit 51 may access the rewritable non-volatile memory module 43 according to the information in this logical to physical mapping table.

In one exemplary embodiment, the memory management circuit 51 may use physical unit groups to manage the physical units 610(0) to 610(A). One physical unit group may include multiple physical units. One physical unit group may be used for storing multiple frames. One physical unit may be used for storing one or more frames. One single physical unit group may include physical units on the same (or different) memory plane, the same (or different) memory die, and/or the same (or different) chip enabled (CE) area.

In one exemplary embodiment, the error detecting and correcting circuit 54 may perform the multi-frame encoding on multiple frames stored in a certain physical unit group to protect the data in these frames using the parity data generated by the multi-frame encoding. In addition, the error detecting and correcting circuit 54 may perform the multi-frame decoding on multiple frames read from a certain physical unit group to correct errors in these frames using the parity data generated by the multi-frame encoding.

In one exemplary embodiment, the error detecting and correcting circuit 54 may perform the single-frame encoding on a single frame stored in a certain physical unit to protect the data in this single-frame using the parity data generated by the single-frame encoding. In addition, the error detecting and correcting circuit 54 may perform the single-frame decoding on a single frame read from a certain physical unit to correct the error in this single frame using the parity data generated by the single-frame encoding.

Figure 7:
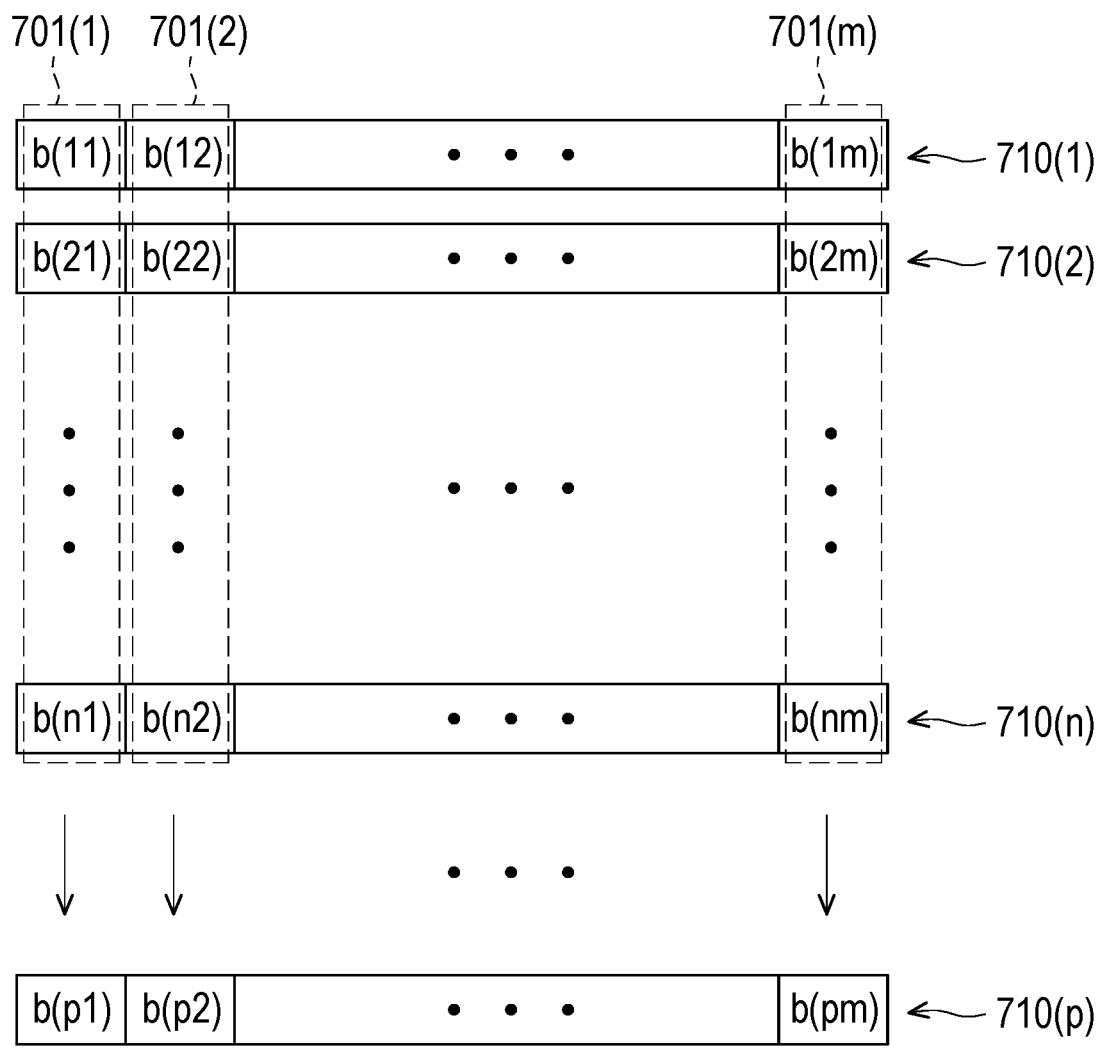
FIG. 7 is a schematic diagram of a multiple frame encoding shown according to an exemplary embodiment of the present invention.

FIG. 7 is a schematic diagram of a multiple frame encoding shown according to an exemplary embodiment of the present invention. Referring to FIG. 7, frames 710(1) to 710(n) includes data stored in a certain physical unit group. For example, this physical unit group may include multiple physical units in FIG. 6. For example, the frame 710(k) includes data to be stored in the physical unit 610(k), and k is an integer between 1 and n. The data in the frames 710(1) to 710(n) may include the data stored instructed by the write command of the host system 10. Alternatively, the data in the frames 710(1) to 710(n) may also include data read from the rewritable non-volatile memory module 43 and waiting to be stored back to the rewritable non-volatile memory module 43.

In one exemplary embodiment, the error detecting and correcting circuit 54 may perform the multi-frame encoding on the frames 710(1) to 710(n) to generate the frame 710(p). The data in the frame 710(p) includes the parity data for protecting the frames 710(1) to 710(n). For example, when performing the multi-frame decoding on the frames 710(1) to 710(n), the parity data in the frame 710(p) may be used for detecting and/or correcting the error in the frames 710(1) to 710(n).

In one exemplary embodiment, the multi-frame encoding encodes the data in the frames 710(1) to 710(n) based on the location of each bit (or bit group). For example, bits b(11), b(21), . . . , b(n1) at a location 701(1) may be encoded to obtain a bit b(p1) in the frame 710(p); bits b(12), b(22), . . . , b(n2) at a location 701(2) may be encoded to obtain a bit b(p2) in the frame 710(p); likewise, bits b(1m), b(2m), . . . , b(nm) at a location 701(m) may be encoded to obtain a bit b(pm) in the frame 710(p). Afterwards, in the multi-frame decoding, the bits (also referred to as the parity bits) in the frame 710(p) may be used for detecting and/or correcting error bits in the frames 710(1) to 710(n). For example, the bit b(p2) in the frame 710(p) may be used for detecting or correcting one or more error bits at the location 701(2).

It should be noted that, in one exemplary embodiment, the arrangement of the bits covered by any one of the locations 701(1) to 701(m) may be different from the arrangement shown in FIG. 7, which is not limited by the disclosure. In addition, in one exemplary embodiment, the number of the frames 710(p) including the parity data may also be 2 or more to provide different or better multi-frame decoding capabilities, which is not limited by the disclosure.

In one exemplary embodiment, the error detecting and correcting circuit 54 may perform the single-frame encoding on the frame 710(j) in the frames 710(1) to 710(n) and 710(p) to generate the parity data for protecting the frame 710(j), where j is an integer between 1 and n or j may be p. Afterwards, in the single-frame decoding, the parity data generated by performing the single-frame encoding on the frame 710(j) may be used for detecting and/or correcting the error bit in the frame 710(j).

In one exemplary embodiment, the parity data generated by performing the multi-frame encoding in the frame 710(p) is also referred to as a redundant array of independent disks (RAID) error correcting code. In one exemplary embodiment, the frames 710(1) to 710(n) and 710(p) may also be grouped into one block code. The frames 710(1) to 710(n) and 710(p) may be stored in multiple physical units belonging to the same physical unit group.

In one exemplary embodiment, the memory management circuit 51 may transmit a read command sequence. This read command sequence may instruct to read a certain physical unit (also referred to as the first physical unit) in a certain physical unit group. For example, the memory management circuit 51 may transmit this read command sequence to the rewritable non-volatile memory module 43. The rewritable non-volatile memory module 43 may return the data read from the first physical unit to the memory management circuit 51 according to this read command sequence. The decoding circuit in the error detecting and correcting circuit 54 may perform the single-frame decoding on the frame including the data. For example, if the single-frame encoding is performed on the data in this frame based on LDPC code, the decoding circuit may perform the single-frame decoding on this frame based on LDPC code. If the single-frame decoding is successful (which means that the data in this frame is correct and/or the error has been corrected), the error detecting and correcting circuit 54 may output the successfully decoded data (also referred to as decoded frame or decoded data frame).

In one exemplary embodiment, the memory management circuit 51 may get a read command from the host system 11. This read command may instruct to read the data belonging to a specific logical unit (also referred to as the first logical unit), and the first logical unit is mapped to the first physical unit. According to this read command, the memory management circuit 51 may transmit the read command sequence (also referred to as first read command sequence) to the rewritable non-volatile memory module 43 to read the data from the first physical unit.

In one exemplary embodiment, without receiving the read command from the host system 11, the memory management circuit 51 may also actively transmit the read command sequence to the rewritable non-volatile memory module 43 to read the data from a specified physical unit of the rewritable non-volatile memory module 43. For example, the memory management circuit 51 may actively read the data from the specified physical unit when performing an enhanced (advanced) decoding operation, performing the data consolidation operation (e.g., garbage collection operation), performing wear leveling (WL) operation, processing read disturb, and/or processing data retention.

In one exemplary embodiment, if the aforementioned single-frame decoding fails (indicating that this frame is a frame that unable to be corrected by the single-frame decoding), then the decoding circuit in the error detecting and correcting circuit 54 may perform the multi-frame decoding on multiple frames including this frame when the default condition is satisfied. For example, under a situation that the default condition is satisfied, if the multi-frame encoding is performed on this frame originally based on the XOR code, then the error detecting and correcting circuit 54 may also perform the multi-frame decoding on this frame based on the XOR code. In one exemplary embodiment, a frame that is unable to be corrected by the single-frame decoding is also referred to as a UECC frame.

It should be noted that in the multi-frame decoding based on the XOR code, there may only be at most one UECC frame in the frames to be decoded at the same time. If the frames to be decoded include two or more UECC frames at the same time, the multi-frame decoding based on the XOR code is unable to correct the errors in these frames.

In one exemplary embodiment, before performing the multi-frame decoding, the memory management circuit 51 may determine whether one default condition is satisfied. This default condition is used for triggering the multi-frame decoding on the physical unit group. In one exemplary embodiment, in response to this default condition being satisfied, the memory management circuit 51 may instruct the error detecting and correcting circuit 54 to perform the multi-frame decoding on the physical unit group. In addition, if this default condition is not satisfied, the memory management circuit 51 may prohibit the multi-frame decoding from being performed. This ensures the correctness of the decoding result of the multi-frame decoding performed.

In one exemplary embodiment, the memory management circuit 51 may represent a total number of UECC frames in the physical unit group by a count value. For example, this count value may be equal to the total number of UECC frames in the physical unit group. In one exemplary embodiment, in response to this count value reaching (e.g., less than or equal to) a critical value, the memory management circuit 51 may determine that the default condition is satisfied. In addition, if the count value does not reach (e.g., is greater than) this critical value, the memory management circuit 51 may determine that the default condition is not satisfied.

Figure 8:
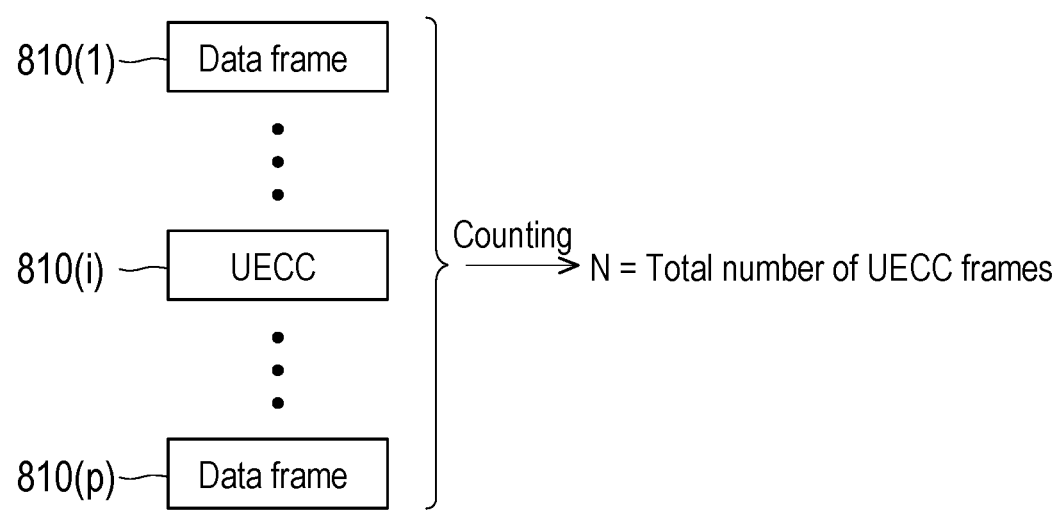
FIG. 8 is a schematic diagram of obtaining a count to represent the total number of UECC frames in a physical unit group shown according to an exemplary embodiment of the present invention.

FIG. 8 is a schematic diagram of obtaining a count to represent the total number of UECC frames in a physical unit group shown according to an exemplary embodiment of the present invention. Referring to FIG. 8, multiple frames read from the physical unit group are represented by the frames 810(1) to 810(p). After performing the single-frame decoding on the frames 810(1) to 810(p) respectively, the UECC frame (e.g., the frame 810(i)) in the frames 810(1) to 810(p) may be recorded, as shown in FIG. 8. The memory management circuit 51 may count the total number of UECC frames in the frames 810(1) to 810(p) and obtain the count value N according to this total number. That is, the count value N may be equal to or reflect the total number of UECC frames in the frames 810(1) to 810(p).

In one exemplary embodiment, assuming that the error detecting and correcting circuit 54 performs the multi-frame encoding and decoding based on the XOR code, the critical value may be set to "1". Thus, if the count value N is equal to "1", the memory management circuit 51 may determine that the default condition is satisfied.

In one exemplary embodiment, the memory management circuit 51 instructs the decoding circuit in the error detecting and correcting circuit 54 to perform the single-frame decoding (also referred to as the first single-frame decoding) on the frame (also referred to as the first data frame) read from the first physical unit to correct the error in the first data frame. In one exemplary embodiment, if the first single-frame decoding is successful, the memory management circuit 51 may output the successfully decoded data. For example, the memory management circuit 51 may transmit the successfully decoded data to the host system 11 in response to the read command. Alternatively, when performing the data consolidation operation (e.g., garbage collection operation), performing WL operation, processing read disturb, and/or processing data retention, the memory management circuit 51 may store the successfully decoded data to a specific physical unit and/or perform corresponding operations on the successfully decoded data. In one exemplary embodiment, if the first single-frame decoding fails, but the default condition is satisfied, the decoding circuit may perform the multi-frame decoding on the first data frame to correct the error in the first data frame.

In one exemplary embodiment, if the first single-frame decoding fails and the default condition is not satisfied, the memory management circuit 51 may obtain error evaluation information (also referred to as the first error evaluation information) corresponding to the physical unit group. The first error evaluation information is related to a bit error rate of the physical unit group. For example, the first error evaluation information may roughly reflect the total number of error bits included in the data read from the physical unit group.

In an exemplary embodiment, the memory management circuit 51 and the decoding circuit may further attempt to decode the first data frame by performing an enhanced decoding operation when the first single-frame decoding fails. Specifically, the memory management circuit 51 generates enhanced first error evaluation information based on said first error evaluation information. Next, the memory management circuit 51 may instruct the decoding circuit to perform another single-frame decoding (also referred to as a third single-frame decoding) on the first data frame based on said enhanced first error evaluation information in order to attempt to correct an error in the first data frame based on the enhanced first error evaluation information.

In an exemplary embodiment, the memory management circuit 51 may obtain or update reliability information based on the enhanced first error evaluation information. For example, this reliability information may include a Log Likelihood Ratio (LLR) that may be used in single-frame decoding. In addition, the memory management circuit 51 may further adjust the first reliability information corresponding to the first physical unit based on such enhanced first error evaluation information to obtain the adjusted first reliability information. Said decoding circuit may perform a third single-frame decoding on the first data frame of the first physical unit by a decoding algorithm (e.g., a low-density parity-checked coding algorithm) according to the adjusted first reliability information. It should be noted that the reliability information used in the third single-frame decoding is dynamically obtained or updated based on the enhanced first error evaluation information, and therefore, the third single-frame decoding may have a higher decoding success rate compared to the first single-frame decoding. That is, compared to the first single-frame decoding, the third single-frame decoding has a higher chance of fully correcting the errors in the first data frame.

In one exemplary embodiment, the first error evaluation information and the enhanced first error evaluation information both include an evaluation value. The evaluation value may be positively related to the overall bit error rate of the physical unit group. For example, the higher the overall bit error rate of the physical unit group, the greater the total number of error bits in the data read from the physical unit group, resulting in a greater evaluation value. Alternatively, another point of view, the evaluation value may be positively related to the total number of error bits in the data read from the physical unit group.

In one exemplary embodiment, the memory management circuit 51 may perform a logical operation on multiple frames (including the first data frame) read from the physical unit group to obtain the first error evaluation information. For example, this logical operation may include an XOR operation. For example, after performing this logical operation, the memory management circuit 51 may obtain a data sequence that reflects the result of this logical operation. The memory management circuit 51 may count the total number of specific bits (e.g., bit "1" or "0") in the data sequence and obtain first error evaluation information according to this total number.

Figure 9:
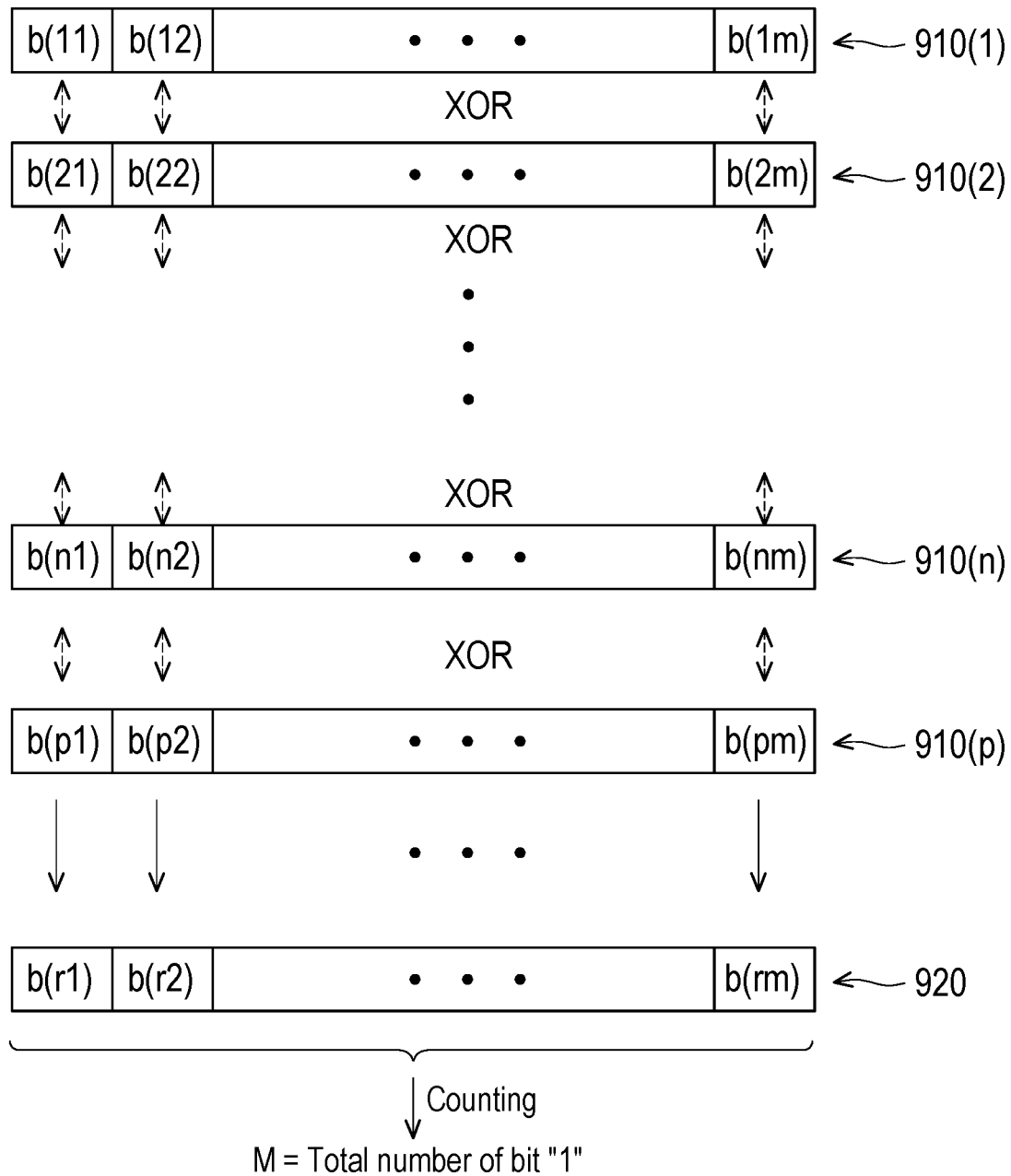
FIG. 9 is a schematic diagram of obtaining first error evaluation information shown according to an exemplary embodiment of the present invention.

FIG. 9 is a schematic diagram of obtaining first error evaluation information shown according to an exemplary embodiment of the present invention. Referring to FIG. 9, multiple frames read from the physical unit group are represented by the frames 910(1) to 910(p). After performing the logical operation including the XOR operation on the frames 910(1) to 910(p), a data sequence 920 (also referred to as error evaluation information) may be obtained. For example, the data sequence 920 may include bits b(r1) to b(rm). For example, the bit b(r1) reflects the result of the XOR operation of the bits b(11), b(21) . . . to b(p1); the bit b(r2) reflects the result of the XOR operation of the bits b(12), b(22) . . . to b(p2); the bit b(rm) reflects the result of the XOR operation of the bits b(1m), b(2m) . . . to b(pm); and so on. The memory management circuit 51 may count the total number of bits "1" in the data sequence 920 and obtain an evaluation value M according to this total number. For example, the evaluation value M may equal or reflect the total number of bits "1" in the data sequence 920. This evaluation value M may be positively related to the overall bit error rate of the physical unit group. That is, the more error bits in the frames 910(1) to 910(p), the greater the evaluation value M. Alternatively, if there is no error bit in the frames 910(1) to 910(p), the evaluation value M may be zero. It is worth mentioning that since the error evaluation information reflects the status of the error bits of the data frames of all the physical units of the physical unit group, it is not easy to determine the distribution status of the error bits of the data frame corresponding to a single physical unit (e.g., the first data frame corresponding to a first physical unit) by the error evaluation information. In order to more effectively determine the distribution status of the error bits of the data frame of a single physical unit, this exemplary embodiment provides an enhanced error evaluation information, so as to reduce the interference of the error bits of other physical units to the error evaluation information, and then more effectively determine the distribution status of the error bits of the data frame of a single physical unit.

Figures 10, 11:
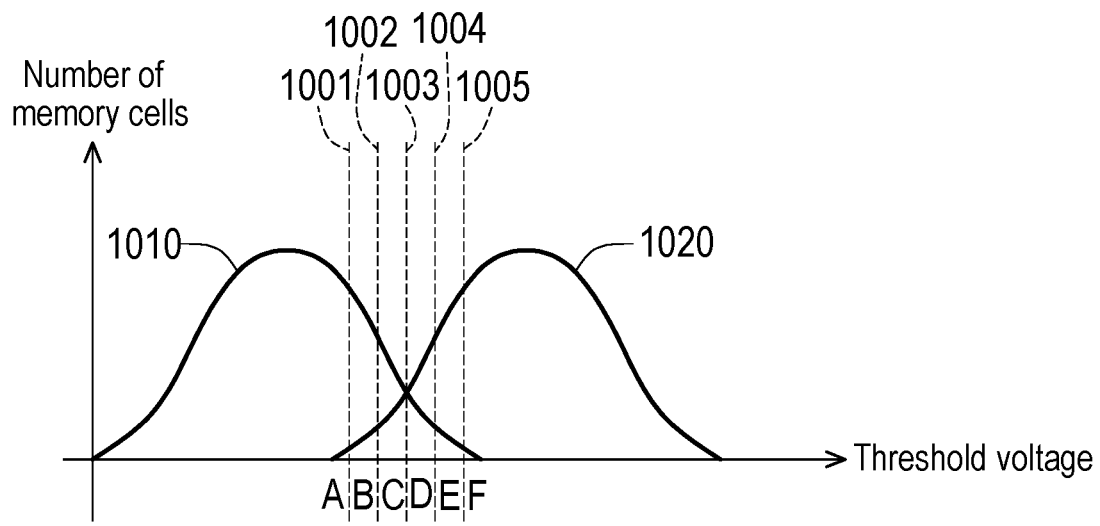
FIG. 10 is a schematic diagram of a threshold voltage distribution of a memory cell shown according to an exemplary embodiment of the present invention.
FIG. 11 is a schematic diagram of a reliability information table shown according to an exemplary embodiment of the present invention.

FIG. 10 is a schematic diagram of a threshold voltage distribution of a memory cell shown according to an exemplary embodiment of the present invention. Referring to FIG. 10, it is assumed that the threshold voltage distribution of the memory cell in the physical unit group includes statuses 1010 and 1020. The status 1010 may represent the distribution status of the threshold voltage of the memory cell used for storing the first bit (or the first bit combination) in these memory cells. The status 1020 may represent the distribution status of the threshold voltage of the memory cell used for storing the second bit (or the second bit combination) in these memory cells. For example, the first bit may be the bit "0" (or the first bit combination may be the bit "000", etc.), and the second bit may be the bit "1" (or the second bit combination may be the bit "101", etc.). In addition, the disclosure does not limit the bits or bit combinations corresponding to the status 1010 and status 1020 respectively.

In one exemplary embodiment, the memory management circuit 51 may transmit a read command sequence to the rewritable non-volatile memory module 43 to instruct the rewritable non-volatile memory module 43 to use read voltage levels 1001 to 1005 to read these memory cells. The total number of the read voltage levels 1001 to 1005 may be more or less. According to the reading results of these memory cells by the read voltage levels 1001 to 1005, the memory management circuit 51 may identify the threshold voltage of each of these memory cells as belonging to one of the voltage ranges A to F. Afterwards, assuming that the threshold voltage of a certain memory cell belongs to the voltage range A, the reliability information (e.g., LLR) corresponding to the voltage range A may be used in the single-frame decoding to decode the data bit read from this memory cell. Alternatively, assuming that the threshold voltage of a certain memory cell belongs to the voltage range C, the reliability information (e.g., LLR) corresponding to the voltage range C may be used in the single-frame decoding to decode the data bit read from this memory cell, and so on.

FIG. 11 is a schematic diagram of a reliability information table shown according to an exemplary embodiment of the present invention. Referring to FIG. 11, it is assumed that table data 1101 records reliability information corresponding to different first error evaluation information. In one exemplary embodiment, if the evaluation value M=M(1) in the enhanced first error evaluation information, then according to the table data 1101, the parameter value (e.g., the LLR value) corresponding to the voltage ranges A to F in the reliability information LLR(0) may be used in the third single-frame decoding to decode the data read from the first physical unit (i.e., the first data frame). Similarly, if the evaluation value M=M(2) or M(3) in the enhanced first error evaluation information, then according to the table data 1101, the parameter value (e.g., the LLR value) corresponding to the voltage ranges A to F in the reliability information LLR(1) or LLR(2) may be used in the third single-frame decoding to decode the data read from the first physical unit (i.e., the first data frame)

In one exemplary embodiment, it is assumed that the reliability information used in the first single-frame decoding is LLR(0). After obtaining the latest evaluation value M=M(2) corresponding to an enhanced error evaluation information, the reliability information used in the third single-frame decoding may be adjusted from LLR(0) to LLR(1). Afterwards, in the third single-frame decoding, the decoding circuit may decode the first data frame based on the reliability information LLR(1). Under the bit error status corresponding to the evaluation value M=M(2), compared with the reliability information LLR(0), performing the single-frame decoding based on the reliability information LLR(1) may improve the decoding success rate of the single-frame decoding. Thus, even if the first single-frame decoding fails, there is still a high probability that the first data frame may be successfully decoded in the third single-frame decoding (i.e., all errors in the first data frame are corrected). It should be noted that even if the decoding success rate of the third single-frame decoding is higher than the decoding success rate of the first single-frame decoding, the third single-frame decoding may still fail (i.e., fail to correct all errors in the first data frame).

Figure 12:
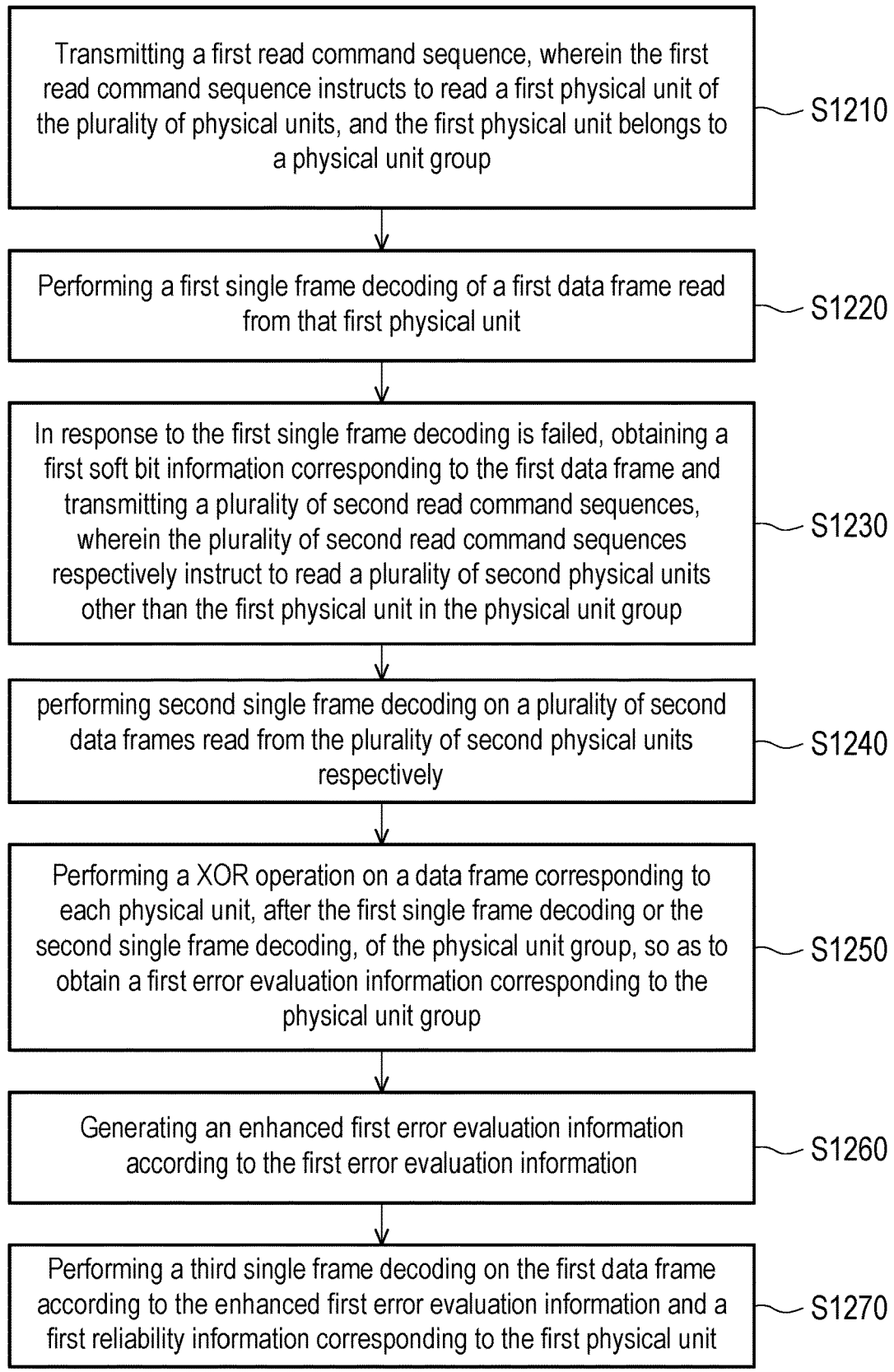
FIG. 12 is a flowchart of a decoding method shown according to an exemplary embodiment of the present invention.

Referring to FIG. 12, in step S1210, the memory control circuit unit 42 transmits a first read command sequence, wherein the first read command sequence instructs to read a first physical unit (also referred to as target physical unit) of the plurality of physical units, and the first physical unit belongs to a physical unit group. In an embodiment, the memory control circuit unit 42 generates the first read command sequence based on a read command from the host system 11. In another embodiment, the memory control circuit unit 42 may also generate the first read command sequence based on various operations used to manage the storage device 10. Wherein, the physical unit group includes a parity physical unit for storing parity data (e.g., data frame 710(*p*) shown in FIG. 7), wherein the parity data is generated based on data stored in a plurality of other physical units (e.g., data frames 710(1)~710(*n*) shown in FIG. 7) other than that parity physical unit in the physical unit group. In an exemplary embodiment, the parity data is Redundant Array of Independent Disks (RAID) error correction code, wherein the RAID error correction code is the result of performing an XOR algorithm on the data frames stored in each of the plurality of other physical units.

Next, in step S1220, the memory control circuit unit 42 performs a first single-frame decoding on a first data frame read from the first physical unit. Next, in step S1230, in response to the first single-frame decoding is failed, the memory control circuit unit 42 obtains a first soft bit information corresponding to the first data frame and transmits a plurality of second read command sequences, wherein the plurality of second read command sequences respectively instruct to read a plurality of second physical units other than the first physical unit in the physical unit group. It is worth mentioning that when the read voltage is used to read the physical unit, the obtained multiple sets of soft-bit information can be used to reflect the voltage intervals in which the threshold voltages of each memory cell of the physical unit are located. In this embodiment, the memory control circuit unit 42 uses the first set of soft-bit information to generate enhanced first error evaluation information for performing an enhanced decoding. In other embodiments, other set of soft-bit information may also be used to generate enhanced first error evaluation information. On the other hand, in response to the single-frame decoding is success, the memory control circuit unit 42 obtains the decoded first data frame. The decoded first data frame may be transmitted to the host system 11 in response to the read command. In addition, the memory control circuit unit 42 may store that decoded first data frame to a further first physical unit, and replace the mapping relationship of the first physical unit by the another first physical unit. In addition, the further first physical unit is assigned to the physical unit group and the first physical unit is removed from the physical unit group.

In the exemplary embodiment, the plurality of second read command sequences are not generated based on one or more read commands of the host system 11. The plurality of second read command sequences are read command sequences that the memory control circuit unit 42 actively generates and sends for enhancing the decoding performed on the first physical unit.

Next, in step S1240, the memory control circuit unit 42 performs a second single-frame decoding on a plurality of second data frames read from the plurality of second physical units respectively.

In an exemplary embodiment, the step of performing the first single-frame decoding on the first data frame read from that first physical unit includes: performing, by a Low Density Parity Check code (LDPC code) algorithm, the first single-frame decoding on that first data frame using the first reliability information corresponding to the first physical unit. Additionally, in an exemplary embodiment, the step of performing the second single-frame decoding on a second data frame read from each second physical unit includes: the memory control circuit unit 42 performs a hard decoding (hard-bit decoding) operation on the second data frame, wherein in response to the hard decoding operation is failed, the memory control circuit unit 42 performs a soft decoding (soft-bit decoding) operation on the second data frame by LDPC code algorithm, so as to use a second reliability information corresponding to the second physical unit to perform the second single-frame decoding.

Next, after completion of that plurality of second single-frame decoding, at step S1250, the memory control circuit unit 42 performs a XOR operation on a data frame corresponding to each physical unit, after the first single-frame decoding (e.g., performed on the first physical unit) or the second single-frame decoding (e.g., performed on the second physical units), of the physical unit group, so as to obtain a first error evaluation information corresponding to the physical unit group. That is, the memory control circuit unit 42 performs an XOR operation (e.g., in the manner shown in FIG. 9) on the bit values of each data frame belonging to the physical unit group (including the original data frame that was not successfully decoded and the decoded data frame that was successfully decoded) to obtain first error evaluation information corresponding to the physical unit group.

In more detail, in an exemplary embodiment, in response to the second single-frame decoding corresponding to a third data frame of the plurality of second data frames is success, the memory control circuit unit 42 obtains decoded third data frame, wherein the (decoded) third data frame corresponds to a third physical unit of the plurality of second physical units. Next, the memory control circuit unit 42 stores the decoded third data frame to a further third physical unit in the physical units, adding the further third physical unit into the physical unit group to replace the third physical unit of the physical unit group (i.e., the third physical unit is removed from the physical unit group and a third logical unit mapped to the third physical unit is changed to map to the further third physical unit).

In opposite, in response to the second single-frame decoding corresponding to a fourth data frame of the plurality of second single frames is failed, the memory control circuit unit 42 obtains a fourth soft-bit information corresponding to the fourth data frame, wherein the fourth data frame corresponds to a fourth physical unit of the plurality of second physical units.

That is, if the data frame of one (e.g., the third physical unit) of the second physical units is successfully decoded, the corresponding decoded data frame is saved to the other physical unit and that other physical unit replaces the original one physical unit in the physical unit group (and the data frame of the physical unit group is updated); If a data frame in one (e.g., the fourth physical unit) of the second physical units is decoded unsuccessfully (failed), the data frame is retained in the physical unit group until it is successfully decoded. Next, after completing the first single-frame decoding and the plurality of second single-frame decoding, the memory control circuit unit 42 performs an XOR operation on each of the currently corresponding data frames of the physical unit group to obtain the first error evaluation information corresponding to the physical unit group. The error evaluation information is also known as the XOR vector.

In this way, by performing single-frame decoding on each of the multiple physical units other than the first physical unit in the physical unit group, and by replacing the original data frames with decoded data frames, the interference conducted by possible error bits that may be present in the error evaluation information generated by the physical unit group will be reduced.

Next, in step S1260, the memory control circuit unit 42 generates an enhanced first error evaluation information according to the first error evaluation information. Next, in step S1270, the memory control circuit unit 42 performs a third single-frame decoding on the first data frame according to the enhanced first error evaluation information and a first reliability information corresponding to the first physical unit.

Specifically, the steps of generating the enhanced first error evaluation information according to the first error evaluation information includes: adjusting one or more target first bits among one or more first bits, having the first value, of the plurality of bits of the first error evaluation information to a second value, so as to obtain the enhanced first error evaluation information. In one embodiment, the first value is 1 and the second value is 0, but the invention is not limited thereto. For example, in another embodiment, this first value is 0 and this second value is 1. In detail, the bit with the first value in the first error evaluation information and the enhanced first error evaluation information is called the first bit, and when the first value is adjusted to the second value, it is no longer the first bit. Therefore, the number of first bits in the enhanced first error evaluation information will be less than the number of first bits in the corresponding first error evaluation information.

In an exemplary embodiment, a randomized approach may be utilized to generate the enhanced first error evaluation information corresponding to the first error evaluation information. For example, using a randomized approach, randomly selecting target first bits among the one or more first bits, and adjust the selected target first bits to the second value. In an embodiment, the memory control circuit unit 42 may generate mask information having a randomly distributed first value, and the total number of bits and arrangement (e.g., both are vectors) of the mask information is equivalent to the first error evaluation information. The memory control circuit unit 42 may perform an AND operation with the mask information and the first error evaluation information, and use the result of the AND operation as the enhanced first error evaluation information.

Figure 13:
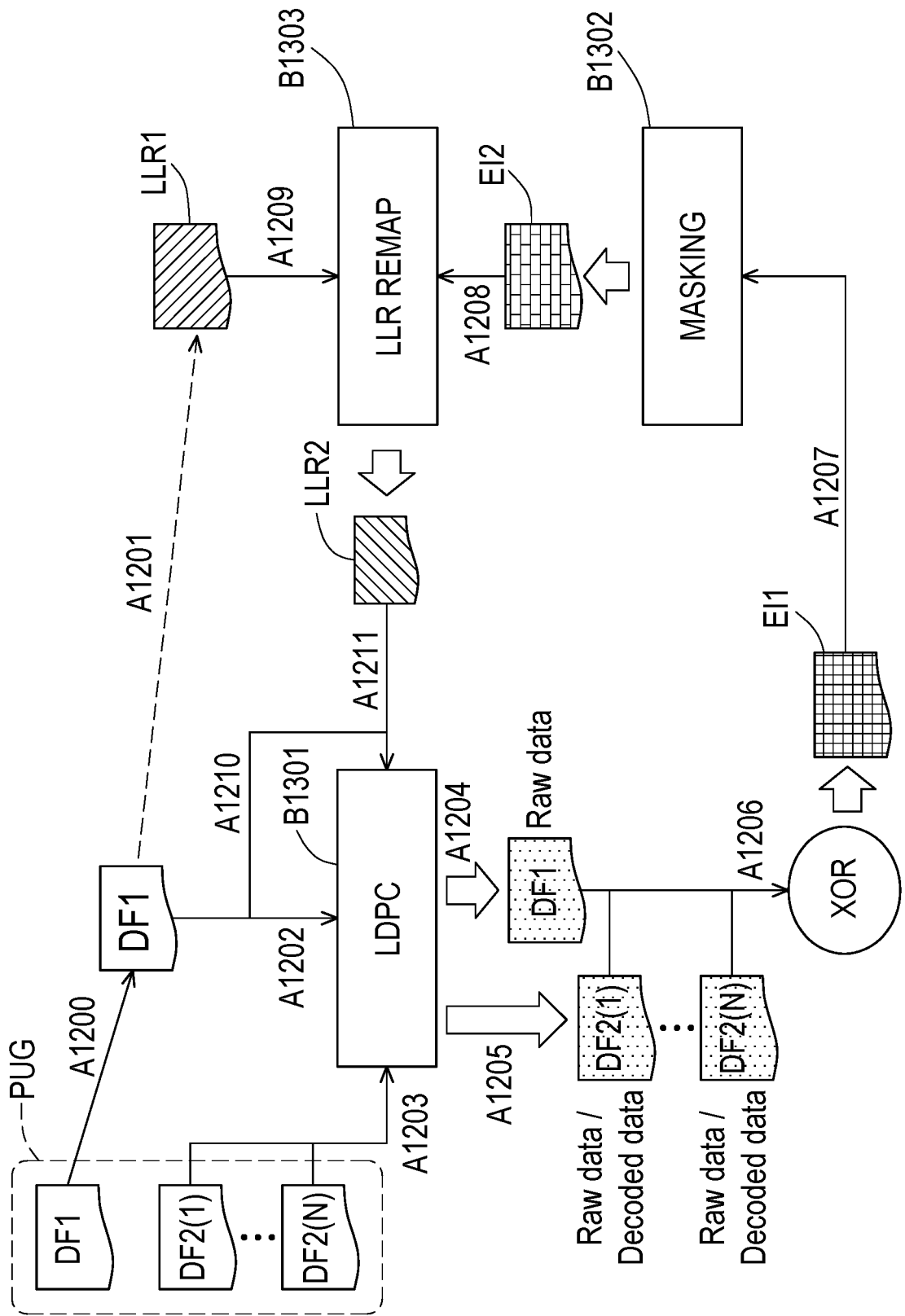
FIG. 13 is a schematic flow diagram of an enhanced decoding operation using enhanced error evaluation information generated via mask shown according to exemplary embodiments of the present invention.

Referring to FIG. 13, it is assumed that a plurality of physical units belonging to a physical unit group PUG store data frames DF1, DF2(1)~DF2(N). Wherein, DF2(N) is, for example, parity data generated by the XOR algorithm for data frames DF1, DF2(1)~DF2(N−1).

Based on the read command from the host system 11, the memory control circuit unit 42 issues a first read command sequence to read a first data frame DF1 of the first physical unit (shown by arrow A1200). During the reading process, the memory control circuit unit 42 may obtain first reliability information LLR1 corresponding to the first physical unit (as shown by arrow A1201).

Memory control circuit unit 42 then performs first single-frame decoding on the first data frame DF1 via the LDPC algorithm/decoding circuit (B1301) (shown by arrow A1202).

In response to the first single-frame decoding is failed, the memory control circuit unit 42 sends a second read command sequence to read data frames DF2(1)~DF2(N), and performs the second single-frame decoding on each of data frames DF2(1)~DF2(N) (as shown by arrow $Al_2O_3$).

As shown by arrows A1204, A1205, after completion of the first single-frame decoding and the plurality of second single frames decoding, the memory control circuit unit 42 identifies the plurality of data frames DF1, DF2(1) to DF2(N) (gray background) corresponding to the physical unit group PUG, wherein each of these data frames will be different depending on whether the corresponding single-frame decoding was successful or not. For example, assuming that the first data frame DF1 corresponds to a failed first single-frame decoding, the first data frame DF1 (gray background) will be the original first data frame DF1 (i.e., raw data). For example, the $N^{th}$ second data frame DF2(N) (gray background) corresponds to a successful second single-frame decoding, and the $N^{th}$ second data frame DF2(N) (gray background) is not the original $N^{th}$ second data frame DF2(N), but rather the $N^{th}$ second data frame DF2(N) (i.e., decoded data) that has been decoded (decoded successfully).

Next, as shown by arrow A1206, the memory control circuit unit 42 performs an XOR operation on each of the data frames DF1, DF2(1)~DF2(N) (gray background) of the physical unit group PUG to obtain the first error evaluation information EI1. Next, the memory control circuit unit 42 generates enhanced first error evaluation information EI2 based on the first error evaluation information EI1 (A1207), e.g., by using a random mask (B1302). Details of the random mask can be seen in the description corresponding to FIG. 14.

Next, the memory control circuit unit 42 adjusts the first reliability information LLR1 corresponding to the first physical unit according to the enhanced first error evaluation information EI2 to obtain the adjusted first reliability information LLR2 (as shown by arrows A1208, A1209). This operation of adjusting reliability information is also referred to as LLR remap (B1303), details of which can be found in the above description corresponding to FIG. 11.

Next, the memory control circuit unit 42 uses the adjusted first reliability information LLR2 (shown by arrow A1211) to perform the first single-frame decoding (shown by arrow A1210) on the first data frame DF1 again. The first single-frame decoding performed again is also referred to as a third single-frame decoding.

Figure 14:
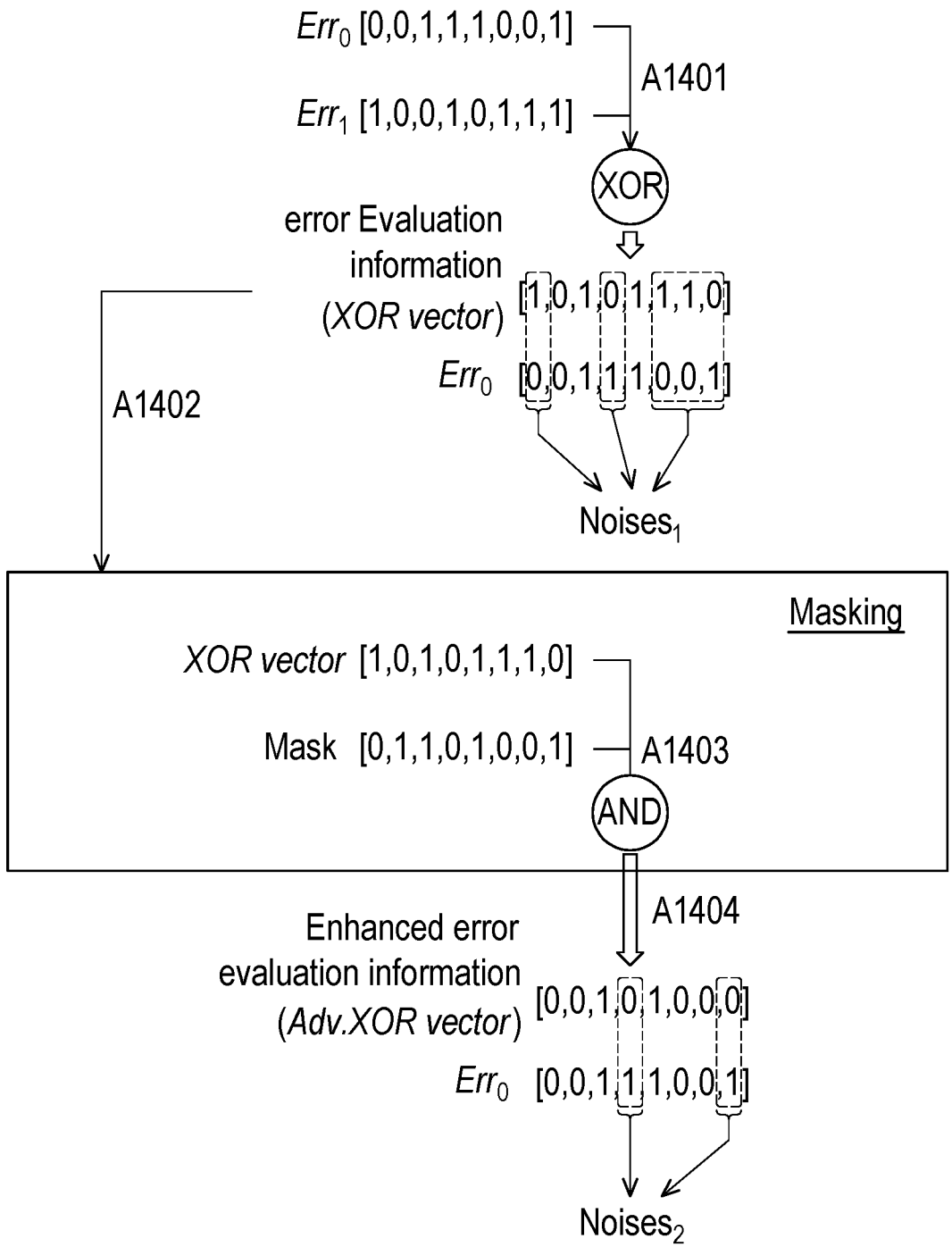
FIG. 14 is a schematic diagram of generating enhanced error evaluation information via random mask information and error evaluation information shown according to an exemplary embodiment of the present invention.

Referring to FIG. 14, assuming that the physical unit group has two UECCs, the possible error bit information thereof is, for example, error bit information $Err_0$ corresponding to a first data frame and error bit information $Err_1$ corresponding to a fourth data frame ("1" denotes an error bit). The first error evaluation information generated for each data frame of the physical unit group can be regarded as the result of the XOR operation of the error bit information $Err_0$ and $Err_1$ (A1401). As shown in FIG. 14, part of the bit values of the first error evaluation information are different from the error bit information $Err_0$ as compared to the error bit information $Err_0$ of the first data frame, and these bit values at the same position but with different values can be considered as the noise $Noise_1$. For example, the first error evaluation information has five noise bit values due to the influence of the error bit information $Err_1$. As a result, the distribution of error bits of the error bit information $Err_0$ of the first data frame cannot be directly identified from the first error evaluation information.

In this exemplary embodiment, the memory control circuit unit 42 performs a masking operation on the first error evaluation information (A1402). Mask information (Mask) with random distribution of the first value is generated, and then the AND operation (A1403) is performed with the first error evaluation information and the random mask. As shown by arrow A1404, the obtained result is used as the enhanced error evaluation information (Adv. XOR vector). As shown in FIG. 14, compared to the error bit information $Err_0$ of the first data frame, part of the bit values of the enhanced first error evaluation information are different from the error bit information $Err_0$, and these bit values at the same location but with different values can be considered as $Noise_2$. It should be noted that the number of noise bit values that $Noise_2$ has (i.e., two) is less than the number of noise bit values that the first error evaluation information ($Noise_1$) has (i.e., five). That is, by the random approach provided by the above embodiments, enhanced error evaluation information may be generated and it may more effectively reflect the distribution of error bits of the first data frame.

In another exemplary embodiment, the memory control circuit unit 42 may utilize the soft-bit information to generate mask information to generate that enhanced first error evaluation information. Specifically, the steps of generating the enhanced first error evaluation information according to the first error evaluation information includes: identifying the first soft-bit information corresponding to the first data frame; identifying one or more fourth soft-bit information respectively corresponding to one or more fourth data frames, wherein the one or more fourth data frames are read from one or more fourth physical units of the plurality of second physical units of the physical unit group, and wherein the second single-frame decoding performed on each of the one or more fourth data frames fails; and adjusting the first error evaluation information to the enhanced first error evaluation information based on the first soft-bit information and the one or more fourth soft-bit information, wherein the number of one or more first bits in the enhanced first error evaluation information is less than the number of one or more first bits in the first error evaluation information, wherein the value of each first bit is a first value.

Figure 15:
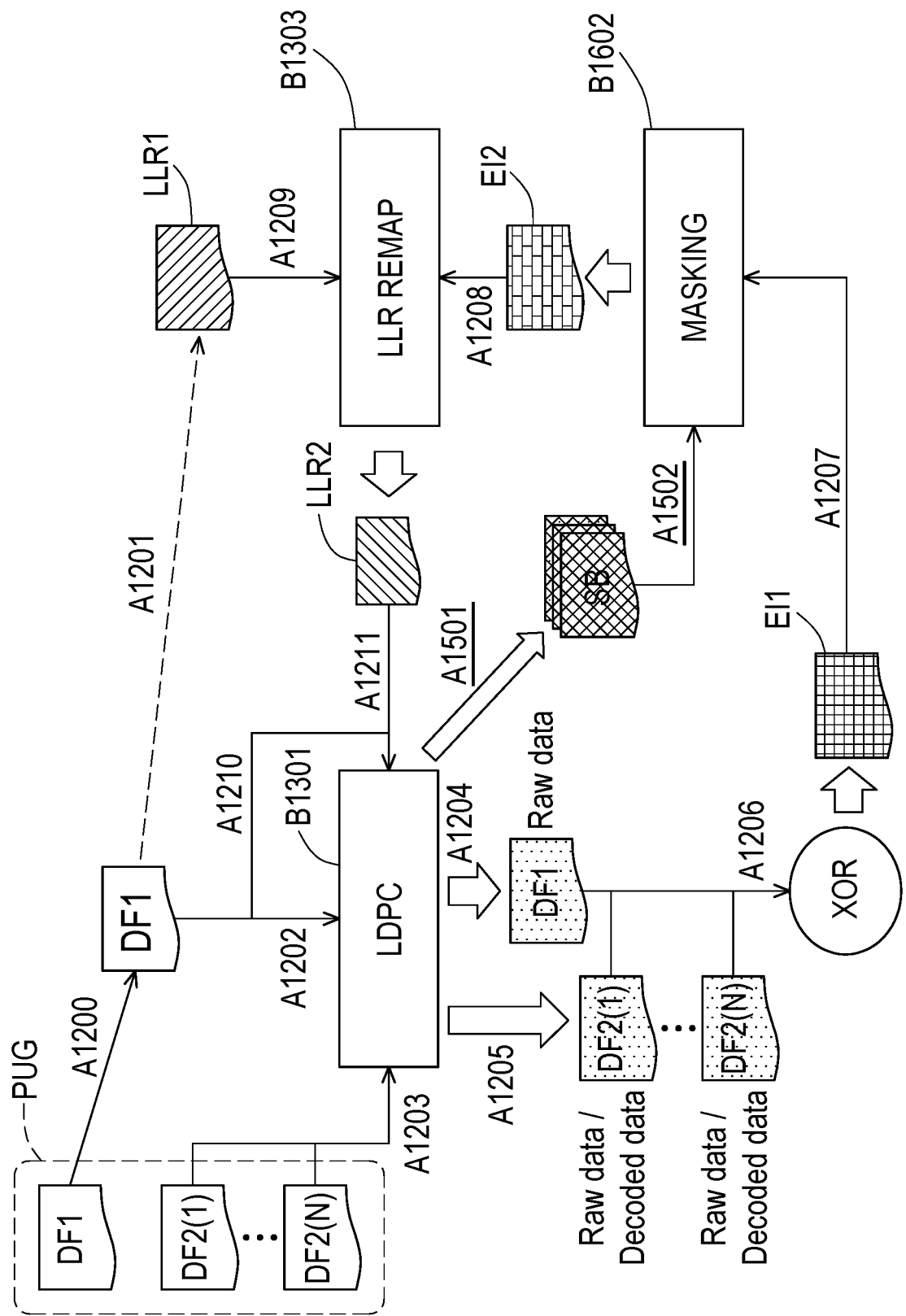
FIG. 15 is a schematic diagram of a flow of an enhanced decoding operation using enhanced error evaluation information generated via another mask shown according to an exemplary embodiment of the present invention.

Referring to FIG. 15, which differs from FIG. 13 in that upon completion of the first single-frame decoding and the plurality of second single frames decoding, as shown by A1501, the memory control circuit unit 42 identifies the first soft-bit information as well as one or more fourth soft-bit information (if decoding of one or more fourth data frames corresponding to the one or more fourth physical units fails). Next, in the step of performing a masking operation (B1602) to generate the enhanced first error evaluation information, the memory control circuit unit 42 generates mask information (A1502) according to the first soft-bit information and the one or more fourth soft-bit information.

In more detail, the memory control circuit unit 42 performs an OR operation on the one or more fourth soft-bit information to obtain a first vector; performs a NOT operation on the first soft-bit information to obtain an inverse first soft-bit information; performs an AND operation on the inverse first soft-bit information and the first vector to obtain a second vector; and performs a NOT operation on the second vector to obtain an inverse second vector, and uses the inverse second vector as a mask corresponding to the first error evaluation information to adjust the first error evaluation information as the enhanced first error evaluation information. For example, an AND operation is performed on that inverse second vector and that first error evaluation information to obtain that enhanced first error evaluation information.

Figure 16:
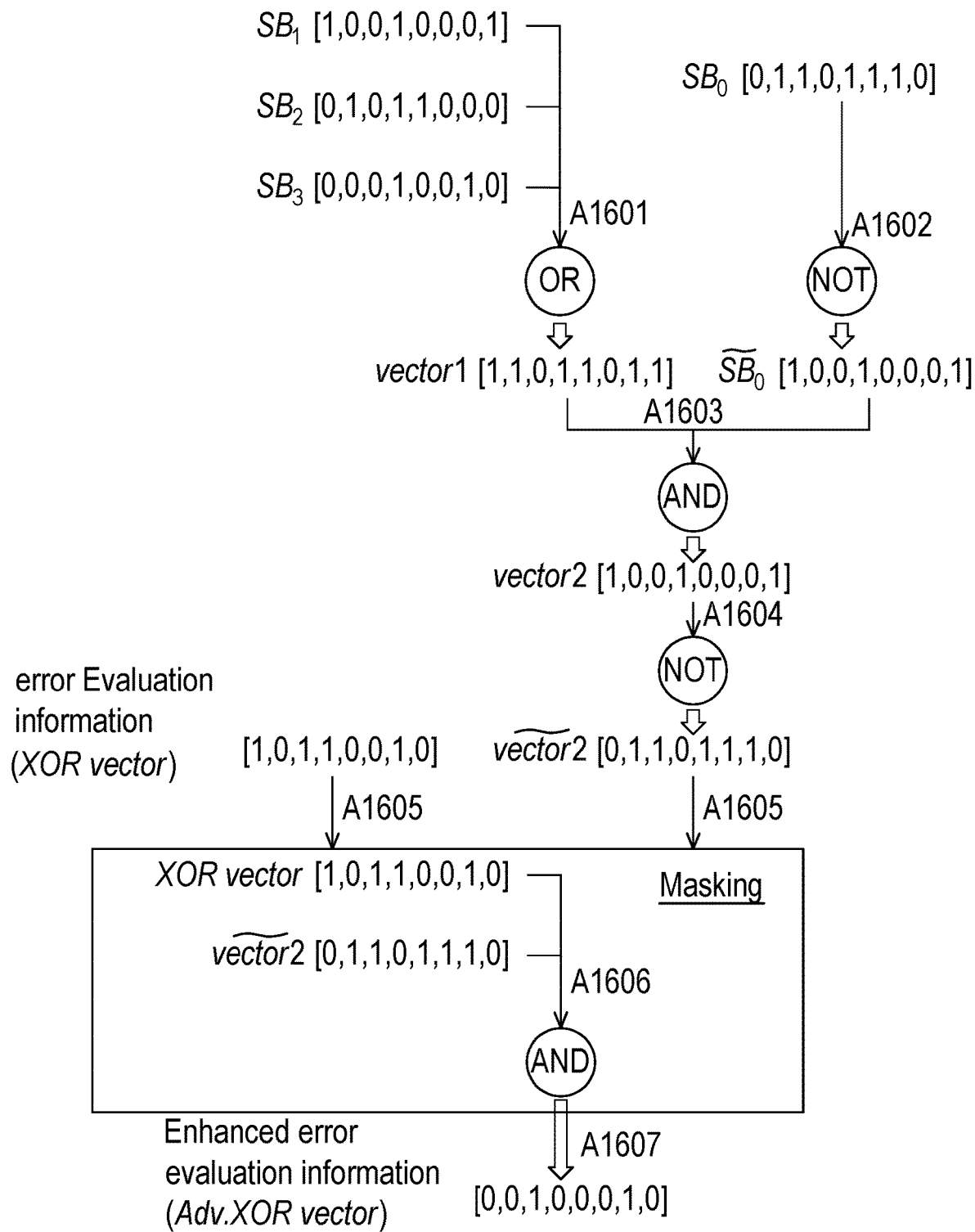
FIG. 16 is a schematic diagram of generating mask information from multiple soft-bit information and generating enhanced error evaluation information by the mask information and error evaluation information shown according to exemplary embodiments of the present invention.

Referring to FIG. 16, assuming that the bit value of the unreliable soft-bit information is "1", in addition to identifying the soft-bit information $SB_0$ corresponding to the first data frame, the memory control circuit unit 42 further identifies three soft-bit information SB1~SB3 corresponding to the three fourth data frames (UECC frames).

First, as shown by arrow A1601, the memory control circuit unit 42 performs an OR operation on the soft-bit information SB1~SB3 to obtain the first vector (vector1). The first vector (vector1) may reflect the distribution status of unreliable bits of soft-bit information for other UECCs.

Next, the memory control circuit unit 42 performs a NOT operation on the soft-bit information $SB_0$ to obtain inverse first soft-bit information $\widetilde{SB}_0$ (as shown by arrow A1602). Then, as shown by arrow A1603, the memory control circuit unit 42 performs an AND operation on the inverse first soft-bit information $\widetilde{SB}_0$ and the first vector (vector1) to obtain a second vector (vector2). The second vector (vector2) may reflect the distribution of unreliable bits having the same locations as the reliable bits corresponding to the first soft-bit information.

Next, as shown by arrow A1604, the memory control circuit unit 42 performs a NOT operation on the second vector (vector2) to obtain an inverse second vector ($\widetilde{vector}\,2$). The inverse second vector ($\widetilde{vector}\,2$) can be used as the mask information.

Here, it is assumed that the memory control circuit unit 42 has generated the first error evaluation information (XOR vector) from the error bit information of the first data frame and error bit information of the three fourth data frames in the manner illustrated in FIG. 14.

Next, as shown by arrows A1605, A1606, the memory control circuit unit 42 performs an AND operation on the first error evaluation information (XOR vector) and the inverse second vector ($\widetilde{vector}\,2$) to obtain enhanced error evaluation information (Adv. XOR vector) (A1607). This enhanced error evaluation information takes into account the distribution of the reliable bit values of the first physical unit as well as the unreliable bit values of other UECC frames, and thus reduces interference caused by unreliable bit values in other UECC frames (the number of first bits in the enhanced error evaluation information can be seen to be less than the number of first bits in the error evaluation information), so as to improve the accuracy of the distribution of error bits reflected by the enhanced error evaluation information.

In an exemplary embodiment, in response to the third single-frame decoding being decoded successfully (i.e., all errors in the first data frame have been corrected), the memory control circuit unit 42 may continuously update the first error evaluation information based on the decoding results of the third single-frame decoding. The updated first error evaluation information provides an overview of the latest bit error rates for multiple physical units in the physical unit group. The memory control circuit unit 42 may then select a data frame that has not been successfully decoded (UECC frame) as the new first data frame to perform the first single-frame decoding, or firstly select the UECC frame with the lowest bit error rate or relatively low error rate for performing first single-frame decoding. In addition, in response to this first single-frame decoding being failed, the memory control circuit unit 42 may also perform the above enhanced decoding operation for the first data frame of the first physical unit on the selected UECC frame based on the updated enhanced first error evaluation information to increase the decoding success rate. By doing so, the total number of UECC frames in the physical unit group can be gradually reduced.

In an exemplary embodiment, in response to a UECC frame read from any of the physical units in the physical unit group being successfully decoded, the memory management circuit 51 may update the count value (e.g., count value N of FIG. 8). The updated count value reflects the total number of latest UECC frames in the physical unit group. In an exemplary embodiment, if the updated count reaches the critical value, the memory management circuit 51 may determine that the preset condition is satisfied and may perform multi-frame decoding. In addition, the memory management circuit 51 may not allow execution of the multi-frame decoding if the updated count value has not yet reached the critical value.

That is, by the decoding method provided by the exemplary embodiment, the UECC frames can be successfully decoded incrementally. Once the total number of UECC frames in the physical unit group reaches the critical value, the multi-frame decoding for the physical unit group can be initiated to ensure that the remaining UECC frames in the physical unit group can be successfully decoded.

In an exemplary embodiment, the first physical unit is also referred to as the target physical unit. In an exemplary embodiment, the physical unit (i.e., the second physical unit) in the physical unit group that is read to assist in decoding the first data frame and/or the physical unit that is read to reduce the total number of UECC frames in the physical unit group is also referred to as a non-target physical unit. In an exemplary embodiment, a frame read from a target physical unit is also referred to as a target data frame, and/or a frame read from a non-target physical unit is also referred to as a non-target data frame.

In an exemplary embodiment, in response to the third single frame decoding corresponding to the target physical unit being successfully decoded, the memory control circuit unit 42 obtains a decoded first data frame corresponding to the target physical unit. The decoded first data frame corresponding to the target physical unit may be transmitted to the host system 11 to respond the read command. In addition, in response to the third single frame decoding corresponding to the target physical unit being decoded successfully, the memory control circuit unit 42 may select another UECC frame corresponding to a non-target physical unit to be the new first data frame, so as perform the enhanced decoding operation from step S1210 to S1270 to try to successfully decode the UECC frames other than the original first data frame, so as to update the error evaluation information and the enhanced error evaluation information.

That is, whether or not the target data frame is successfully decoded, single-frame decoding may continue to be performed on non-targeted data frames that are UECC frames stored in a physical unit group until the target data frame has been successfully decoded, all UECC frames in the physical unit group have been successfully decoded, the preset conditions have been met, or a decoding count limit (e.g., the maximum number of iterations has been reached) has been reached. Furthermore, the corrected frames from the UECC frames can be used to replace the frames originally stored in the physical unit group to improve the success rate for decoding the frames in the future.

Notably, the steps in FIGS. 12 through 16 may be implemented as multiple program codes or circuits, and the present invention is not limited. In addition, the methods of FIGS. 12 to 16 may be used in conjunction with the above exemplary embodiments or alone, without limitation of the present invention.

In summary, the provided decoding method, the memory storage device, and the memory control circuit unit by the exemplary embodiments of the present invention may improve the decoding success rate for target data frames and/or non-target data frames in a particular physical unit group by continually updating and generating the first error evaluation information and enhanced first error evaluation information corresponding to the physical unit group. In addition, by alternately performing single-frame decoding on target data frames and non-target data frames in the same physical unit group and updating the first error evaluation information and the enhanced first error evaluation information based on the decoding results, the decoding success rate of subsequently performed single-frame decoding can also be improved. Furthermore, by adjusting the reliability information used in subsequent decoding operations performed on the target data frame with the enhanced first error evaluation information that better reflects the target data frame, the success rate of decoding on the target data frame can be improved, which in turn increases the efficiency and correctness of the reading operation of the memory storage device.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A decoding method for a rewritable non-volatile memory module, wherein the rewritable non-volatile memory module comprises a plurality of physical units, and the decoding method comprises:

transmitting a first read command sequence, wherein the first read command sequence instructs to read a first physical unit of the plurality of physical units, and the first physical unit belongs to a physical unit group;

performing a first single-frame decoding on a first data frame read from that first physical unit;

in response to the first single-frame decoding is failed, obtaining a first soft bit information corresponding to the first data frame and transmitting a plurality of second read command sequences, wherein the plurality of second read command sequences respectively instruct to read a plurality of second physical units other than the first physical unit in the physical unit group;

performing a second single-frame decoding on a plurality of second data frames read from the plurality of second physical units respectively;

performing a XOR operation on a data frame corresponding to each physical unit, after the first single-frame decoding or the second single-frame decoding, of the physical unit group, so as to obtain a first error evaluation information corresponding to the physical unit group;

generating an enhanced first error evaluation information according to the first error evaluation information; and performing a third single-frame decoding on the first data frame according to the enhanced first error evaluation information and a first reliability information corresponding to the first physical unit.

2. The decoding method according to claim 1, wherein the first error evaluation information comprises a plurality of bits, and wherein each of the plurality of bits has a first value or a second value, wherein the step of generating the enhanced first error evaluation information according to the first error evaluation information comprises:

adjusting one or more target first bits among one or more first bits, having the first value, of the plurality of bits of the first error evaluation information to a second value, so as to obtain the enhanced first error evaluation information.

3. The decoding method according to claim 2, wherein the step of adjusting the one or more target first bits among the one or more first bits, having the first value, of the plurality of bits of the first error evaluation information to the second value comprises:

randomly selecting the target first bits among the one or more first bits to adjust the selected target first bits to the second value.

4. The decoding method according to claim 1, wherein the step of performing the first single-frame decoding on the first data frame read from that first physical unit comprises:
performing, by a Low Density Parity Check code (LDPC code) algorithm, the first single-frame decoding on that first data frame using the first reliability information corresponding to the first physical unit.

5. The decoding method according to claim 4, the method further comprising:

in response to the second single-frame decoding corresponding to a third data frame of the plurality of second data frames is successes, obtaining the decoded third data frame, wherein the third data frame corresponds to a third physical unit of the plurality of second physical units;

storing the decoded third data frame to a further third physical unit in the physical units, adding the further third physical unit into the physical unit group to replace the third physical unit of the physical unit group;

in response to the second single-frame decoding corresponding to a fourth data frame of the plurality of second data frames is failed, obtaining a fourth soft-bit information corresponding to the fourth data frame, wherein the fourth data frame corresponds to a fourth physical unit of the plurality of second physical units, wherein the step of generating the enhanced first error evaluation information according to the first error evaluation information comprises:

obtaining the first soft-bit information corresponding to the first data frame;

obtaining one or more fourth soft-bit information respectively corresponding to one or more fourth data frames; and adjusting the first error evaluation information as the enhanced first error evaluation information according to the first soft-bit information and the one or more fourth soft-bit information, wherein the number of one or more first bits in the enhanced first error evaluation information is less than the number of one or more first bits in the first error evaluation information, wherein value of each first bit is a first value.

6. The decoding method according to claim 5, wherein the step of adjusting the first error evaluation information as the enhanced first error evaluation information according to the first soft-bit information and the one or more fourth soft-bit information comprises:

performing an OR operation on the fourth soft-bit information to obtain a first vector;

performing a NOT operation on the first soft-bit information to obtain an inverse first soft-bit information;

performing an AND operation on the inverse first soft-bit information and the first vector to obtain a second vector; and performing a NOT operation on the second vector to obtain an inverse second vector, and using the inverse second vector as a mask corresponding to the first error evaluation information to adjust the first error evaluation information as the enhanced first error evaluation information.

7. The decoding method according to claim 6, wherein the step of using the inverse second vector as a mask corresponding to the first error evaluation information to adjust the first error evaluation information as the enhanced first error evaluation information comprises:

performing an AND operation on the inverse second vector and the first error evaluation information to obtain the enhanced first error evaluation information.

8. The decoding method according to claim 4, wherein the step of performing the third single-frame decoding on the first data frame according to the enhanced first error evaluation information and the first reliability information corresponding to the first physical unit comprises:

adjusting the first reliability information corresponding to the first physical unit according to the enhanced first error evaluation information to obtain the adjusted first reliability information; and performing, by the LDPC code algorithm, the third single-frame decoding on the first data frame using the adjusted first reliability information.

9. A memory storage device, comprising:
a connection interface unit, configured to couple to a host system;
a rewritable non-volatile memory module, wherein the rewritable non-volatile memory module comprises a plurality of physical units; and
a memory control circuit unit coupled to the connection interface unit and the rewritable non-volatile memory module,
wherein the memory control circuit unit is configured to:
transmit a first read command sequence, wherein the first read command sequence instructs to read a first physical unit of the plurality of physical units, and the first physical unit belongs to a physical unit group;
perform a first single-frame decoding on a first data frame read from that first physical unit;
in response to the first single-frame decoding is failed, obtain a first soft bit information corresponding to the first data frame and transmit a plurality of second read command sequences, wherein the plurality of second read command sequences respectively instruct to read a plurality of second physical units other than the first physical unit in the physical unit group;
perform second single-frame decoding on a plurality of second data frames read from the plurality of second physical units respectively;

perform a XOR operation on a data frame corresponding to each physical unit, after the first single-frame decoding or the second single-frame decoding, of the physical unit group, so as to obtain a first error evaluation information corresponding to the physical unit group;

generate an enhanced first error evaluation information according to the first error evaluation information; and perform a third single-frame decoding on the first data frame according to the enhanced first error evaluation information and a first reliability information corresponding to the first physical unit.

10. The memory storage device according to claim 9, wherein the first error evaluation information comprises a plurality of bits, and wherein each of the plurality of bits has a first value or a second value, wherein the step of generating the enhanced first error evaluation information according to the first error evaluation information comprises:

adjusting one or more target first bits among one or more first bits, having the first value, of the plurality of bits of the first error evaluation information to a second value, so as to obtain the enhanced first error evaluation information.

11. The memory storage device according to claim 10, wherein the step of adjusting the one or more target first bits among the one or more first bits, having the first value, of the plurality of bits of the first error evaluation information to the second value comprises:

randomly selecting the target first bits among the one or more first bits to adjust the selected target first bits to the second value.

12. The memory storage device according to claim 9, wherein the step of performing the first single-frame decoding on the first data frame read from that first physical unit comprises: performing, by a Low Density Parity Check code (LDPC code) algorithm, the first single-frame decoding on that first data frame using the first reliability information corresponding to the first physical unit.

13. The memory storage device according to claim 12, wherein the memory control circuit unit is further configured to:

in response to the second single-frame decoding corresponding to a third data frame of the plurality of second data frames is successes, obtain the decoded third data frame, wherein the third data frame corresponds to a third physical unit of the plurality of second physical units;

store the decoded third data frame to a further third physical unit in the physical units, add the further third physical unit into the physical unit group to replace the third physical unit of the physical unit group;

in response to the second single-frame decoding corresponding to a fourth data frame of the plurality of second data frames is failed, obtain a fourth soft-bit information corresponding to the fourth data frame, wherein the fourth data frame corresponds to a fourth physical unit of the plurality of second physical units, wherein the step of generating the enhanced first error evaluation information according to the first error evaluation information comprises:

obtaining the first soft-bit information corresponding to the first data frame;

obtaining one or more fourth soft-bit information respectively corresponding to one or more fourth data frames; and adjusting the first error evaluation information as the enhanced first error evaluation information according to the first soft-bit information and the one or more fourth soft-bit information, wherein the number of one or more first bits in the enhanced first error evaluation information is less than the number of one or more first bits in the first error evaluation information, wherein value of each first bit is a first value.

14. The memory storage device according to claim 13, wherein the step of adjusting the first error evaluation information as the enhanced first error evaluation information according to the first soft-bit information and the one or more fourth soft-bit information comprises:

performing an OR operation on the fourth soft-bit information to obtain a first vector;

performing a NOT operation on the first soft-bit information to obtain an inverse first soft-bit information;

performing an AND operation on the inverse first soft-bit information and the first vector to obtain a second vector; and performing a NOT operation on the second vector to obtain an inverse second vector, and using the inverse second vector as a mask corresponding to the first error evaluation information to adjust the first error evaluation information as the enhanced first error evaluation information.

15. The memory storage device according to claim 14, wherein the step of using the inverse second vector as a mask corresponding to the first error evaluation information to adjust the first error evaluation information as the enhanced first error evaluation information comprises:

performing an AND operation on the inverse second vector and the first error evaluation information to obtain the enhanced first error evaluation information.

16. The memory storage device according to claim 12, wherein the step of performing the third single-frame decoding on the first data frame according to the enhanced first error evaluation information and the first reliability information corresponding to the first physical unit comprises:

adjusting the first reliability information corresponding to the first physical unit according to the enhanced first error evaluation information to obtain the adjusted first reliability information; and performing, by the LDPC code algorithm, the third single-frame decoding on the first data frame using the adjusted first reliability information.

17. A memory control circuit unit, adapted for controlling a rewritable non-volatile memory module, wherein the rewritable non-volatile memory module comprises a plurality of physical units, and the memory control circuit unit comprises:

a host interface, configured to couple to a host system;

a memory interface, configured to couple to the rewritable non-volatile memory module;

a decoding circuit; and a memory management circuit coupled to the host interface, the memory interface, and the decoder circuit, wherein the memory management circuit is configured to:

transmit a first read command sequence, wherein the first read command sequence instructs to read a first physical unit of the plurality of physical units, and the first physical unit belongs to a physical unit group;

instruct the decoding circuit to perform a first single-frame decoding on a first data frame read from that first physical unit;

in response to the first single-frame decoding is failed, obtain a first soft bit information corresponding to the first data frame and transmit a plurality of second read command sequences, wherein the plurality of second read command sequences respectively instruct to read a plurality of second physical units other than the first physical unit in the physical unit group;

instruct the decoding circuit to perform second single-frame decoding on a plurality of second data frames read from the plurality of second physical units respectively;

perform a XOR operation on a data frame corresponding to each physical unit, after the first single-frame decoding or the second single-frame decoding, of the physical unit group, so as to obtain a first error evaluation information corresponding to the physical unit group;

generate an enhanced first error evaluation information according to the first error evaluation information; and instruct the decoding circuit to perform a third single-frame decoding on the first data frame according to the enhanced first error evaluation information and a first reliability information corresponding to the first physical unit.

18. The memory control circuit unit according to claim 17, wherein the first error evaluation information comprises a plurality of bits, and wherein each of the plurality of bits has a first value or a second value, wherein the step of generating the enhanced first error evaluation information according to the first error evaluation information comprises:

adjusting one or more target first bits among one or more first bits, having the first value, of the plurality of bits of the first error evaluation information to a second value, so as to obtain the enhanced first error evaluation information.

19. The memory control circuit unit according to claim 18, wherein the step of adjusting the one or more target first bits among the one or more first bits, having the first value, of the plurality of bits of the first error evaluation information to the second value comprises:

randomly selecting the target first bits among the one or more first bits to adjust the selected target first bits to the second value.

20. The memory control circuit unit according to claim 17, wherein the step of performing the first single-frame decoding on the first data frame read from that first physical unit comprises: performing, by a Low Density Parity Check code (LDPC code) algorithm, the first single-frame decoding on that first data frame using the first reliability information corresponding to the first physical unit.

21. The memory control circuit unit according to claim 20, wherein the memory management circuit unit is further configured to:

in response to the second single-frame decoding corresponding to a third data frame of the plurality of second data frames is successes, obtain the decoded third data frame, wherein the third data frame corresponds to a third physical unit of the plurality of second physical units;

store the decoded third data frame to a further third physical unit in the physical units, add the further third physical unit into the physical unit group to replace the third physical unit of the physical unit group;

in response to the second single-frame decoding corresponding to a fourth data frame of the plurality of second data frames is failed, obtain a fourth soft-bit information corresponding to the fourth data frame, wherein the fourth data frame corresponds to a fourth physical unit of the plurality of second physical units, wherein the step of generating the enhanced first error evaluation information according to the first error evaluation information comprises:

obtaining the first soft-bit information corresponding to the first data frame;

obtaining one or more fourth soft-bit information respectively corresponding to one or more fourth data frames; and adjusting the first error evaluation information as the enhanced first error evaluation information according to the first soft-bit information and the one or more fourth soft-bit information, wherein the number of one or more first bits in the enhanced first error evaluation information is less than the number of one or more first bits in the first error evaluation information, wherein value of each first bit is a first value.

22. The memory control circuit unit according to claim 21, wherein the step of adjusting the first error evaluation information as the enhanced first error evaluation information according to the first soft-bit information and the one or more fourth soft-bit information comprises:

performing an OR operation on the fourth soft-bit information to obtain a first vector;

performing a NOT operation on the first soft-bit information to obtain an inverse first soft-bit information;

performing an AND operation on the inverse first soft-bit information and the first vector to obtain a second vector; and performing a NOT operation on the second vector to obtain an inverse second vector, and using the inverse second vector as a mask corresponding to the first error evaluation information to adjust the first error evaluation information as the enhanced first error evaluation information.

23. The memory control circuit unit according to claim 22, wherein the step of using the inverse second vector as a mask corresponding to the first error evaluation information to adjust the first error evaluation information as the enhanced first error evaluation information comprises:

performing an AND operation on the inverse second vector and the first error evaluation information to obtain the enhanced first error evaluation information.

24. The memory control circuit unit according to claim 20, wherein the step of performing the third single-frame decoding on the first data frame according to the enhanced first error evaluation information and the first reliability information corresponding to the first physical unit comprises:

adjusting the first reliability information corresponding to the first physical unit according to the enhanced first error evaluation information to obtain the adjusted first reliability information; and instructing the decoding circuit to perform, by the LDPC code algorithm, the third single-frame decoding on the first data frame using the adjusted first reliability information.

* * * * *